Dec. 28, 1954     R. G. MADSEN ET AL     2,698,410
INFORMATION RECORDING AND REPRODUCING SYSTEM
Filed June 15, 1950     11 Sheets-Sheet 1

INVENTORS:
ROYAL GLEN MADSEN
MICHAEL E. STICKNEY
ROLAND C. HAWES
BY THEIR ATTORNEYS
HARRIS, KIECH, FOSTER & HARRIS

Dec. 28, 1954     R. G. MADSEN ET AL     2,698,410
INFORMATION RECORDING AND REPRODUCING SYSTEM
Filed June 15, 1950     11 Sheets-Sheet 2

INVENTORS:
ROYAL GLEN MADSEN
MICHAEL E. STICKNEY
ROLAND C. HAWES
BY THEIR ATTORNEYS
HARRIS, KIECH, FOSTER & HARRIS

Dec. 28, 1954   R. G. MADSEN ET AL   2,698,410
INFORMATION RECORDING AND REPRODUCING SYSTEM
Filed June 15, 1950   11 Sheets-Sheet 3

INVENTORS:
ROYAL GLEN MADSEN
MICHAEL E. STICKNEY
ROLAND C. HAWES
BY THEIR ATTORNEYS
HARRIS, KIECH, FOSTER & HARRIS

Dec. 28, 1954  R. G. MADSEN ET AL  2,698,410
INFORMATION RECORDING AND REPRODUCING SYSTEM
Filed June 15, 1950  11 Sheets-Sheet 5

INVENTORS:
ROYAL GLEN MADSEN
MICHAEL E. STICKNEY
ROLAND C. HAWES
BY THEIR ATTORNEYS
HARRIS, KIECH, FOSTER & HARRIS

INVENTORS:
ROYAL GLEN MADSEN
MICHAEL E. STICKNEY
ROLAND C. HAWES
BY THEIR ATTORNEYS
HARRIS, KIECH, FOSTER & HARRIS

INVENTORS:
ROYAL GLEN MADSEN
MICHAEL E. STICKNEY
ROLAND C. HAWES
BY THEIR ATTORNEYS
HARRIS, KIECH, FOSTER & HARRIS

INVENTORS:
ROYAL GLEN MADSEN
MICHAEL E. STICKNEY
ROLAND C. HAWES
BY THEIR ATTORNEYS
HARRIS, KIECH, FOSTER & HARRIS under United States Patent Office 2,698,410
Patented Dec. 28, 1954

2,698,410

INFORMATION RECORDING AND REPRODUCING SYSTEM

Royal Glen Madsen, Pasadena, Michael E. Stickney, Alhambra, and Roland C. Hawes, Los Angeles, Calif., assignors to Beckman Instruments, Inc., South Pasadena, Calif., a corporation of California Application June 15, 1950, Serial No. 168,308

21 Claims. (Cl. 318—162)

The present invention relates to an apparatus for recording information of various types and for subsequently reproducing the recorded information, either in its original form, or in other forms.

More particularly, the present invention relates to an apparatus for recording variations in variables of various types and for subsequently reproducing the recorded variations as variations in a quantity which is representative of the original variable, such a representative quantity being regarded hereinafter as being either the original variable, or another variable which is a function of the original variable. For example, the invention is applicable to recording such variables as mechanical movements, electrical characteristics, fluid characteristics, temperatures, and the like, and to subsequently reproducing these, or other variables, as quantities which are representative of the original variables. As a more specific example, the invention is applicable to recording a variable such as a mechanical movement, i. e., to recording variations in the position of a mechanical element, and to subsequently reproducing the recorded mechanical movement either by duplicating the original variations in the position of the original mechanical element, by applying the original mechanical movement to some other mechanical element, by translating the original mechanical movement into variations in an electrical characteristic, or the like. Similarly, the invention is applicable to recording a variable electrical characteristic, such as voltage, current, amplitude, frequency, and the like, and to subsequently reproducing such a variable electrical characteristic either in its original form, or in the form of some other variable, such as another electrical characteristic, a mechanical movement, and the like. Thus, in view of these examples, which are not intended to be limiting, it will readily be apparent that the invention is susceptible of a wide variety of applications requiring recording of a variable and subsequent reproduction thereof either in its original form or in the form of a related variable, the provision of such an information recording and reproducing apparatus being a primary object of the invention.

While, as indicated in the preceding paragraph, a primary object of the invention is to provide an apparatus which is capable of recording diverse variables and of reproducing such variables in the form of various quantities which may or may not be the same as the original variables, the invention will be exemplified hereinafter as applied to recording a mechanical movement and to reproducing or reiterating such a mechanical movement as a matter of convenience and without necessarily limiting the invention thereto. There are many fields of application of the invention as embodied in an apparatus for recording and reiterating mechanical movements, examples being the recording and duplicating of machine tool movements, spectrophotometer drive movements, camera movements in motion picture photography, and the like. However, it will be noted that while in the particular applications of the invention considered hereinafter, a mechanical movement is recorded, reproduced and ultimately duplicated, the original mechanical movement is translated into one or more variable electrical characteristics, thereby illustrating also an application of the invention to reproducing one variable in the form of a different variable which is a function of the original variable. The disclosure of such applications of the invention will enable those skilled in the art to practice other applications thereof readily.

Considering the invention more specifically, an important object thereof is to provide an information recording and reproducing apparatus or system for sequentially transforming or translating variations in a variable into phase variations between a cyclical, variable-phase information signal and a reference signal, recording the variable-phase information signal, reproducing the variable-phase information signal, and, finally, transforming or translating phase variations between the reference signal and the variable-phase information signal into variations in a variable, which is either the same as the original variable, or a function thereof. Expressed somewhat differently, it is an object of the invention to provide an information recording and reproducing system which includes (1) phase-modulating means responsive to variations in a variable for varying the phase of a cyclical information signal with respect to a cyclical reference signal as a function of variations in the variable, (2) means for recording the variable-phase information signal and the reference signal, (3) means for reproducing the variable-phase information signal and the reference signal, and (4) phase-demodulating means for translating any variations in the phase of the reproduced, variable-phase information signal with respect to the reference signal into variations in a quantity representative of the original variable, such a quantity being, as hereinbefore discussed, either the same as or differing from the original variable.

An important object of the invention is to provide such a system which records and reproduces the reference signal simultaneously with the information signal so that a definite relation between the reference and information signals is always maintained, which is an important feature of the invention.

Another important object is to provide an information recording and reproducing apparatus which is capable of recording and reproducing two or more variables in precise relation to one another, a related object being to provide an apparatus which simultaneously phase-modulates as many cyclical information signals as there are variables, each with respect to a reference signal, which may be common to all, and which simultaneously records and subsequently simultaneously reproduces such information signals, and which simultaneously phase-demodulates such information signals with respect to the reference signal or signals, and transforms them into quantities respectively duplicating, representative of, or corresponding to the original variables.

An important object of the invention is to provide apparatus capable of recording and reproducing two or more quantities varying in time with high precision in relation to one another regardless of variations which may occur in the speed of the recording medium either during recording or reproduction. In other words, if each variable is expressed as a function of another, this functional relationship may be reproduced with high precision on playback, even if the functional relationships of each variable with time are not accurately reproduced.

Another object is to provide an information recording and reproducing system which similarly records and reproduces two or more variables sequentially, or in various combinations of sequential and simultaneous relationships.

Another object of the invention is to use in such an apparatus a phase-modulating means which comprises a multiphase or polyphase self-synchronous generator, i. e., a self-synchronous generating means having two or more phases, such a generating means being conventionally termed a "synchro" or a "selsyn." A related object is to provide phase-splitting means connected to the field windings of the synchro for splitting the reference signal into cyclical electrical signals of different phases respectively applied to the field windings. With this arrangement, an information signal is induced in the rotor winding of the synchro which varies in phase with respect to the reference signal as a function of the position of the rotor relative to the stator, the information signal being in phase with the reference signal for one position of the rotor and being out of phase with respect thereto for all other positions of the rotor. Thus, the synchro serves as a phase-modulating means of the information recording apparatus while the same or another synchro may serve as an element of a phase-demodulating means in the reproducing apparatus, which is an important feature of the invention.

Another object is to provide an apparatus which includes a recording means connected to the rotor winding of the synchro and additionally to the generating means for the reference signal so as to record simultaneously the reference signal and the phase-modulated or variable-phase information signal from the rotor winding.

The invention contemplates the employment of various conventional recorders for the recording means, such recorders being either of the multichannel, or of the single-channel type. For example, such multichannel recorders as magnetic tape recorders, film recorders, and the like, may be employed, the reference signal and the information signal being recorded on different channels.

However, we prefer to employ for the recording means a single-channel recorder, typically a magnetic wire recorder, and an object of the invention is to provide means for recording the reference signal and one or more information signals simultaneously by use of a single channel, e. g., on a single wire. A related object is to provide means connected to the rotor winding of the synchro and the generating means for the reference signal for mixing the reference and information signals prior to recording, the reference and information signals preferably modulating carriers of different frequencies which are then linearly mixed.

Another object of the invention is to provide an information recording system which includes two or more phase-modulating means, such as synchros, for producing two or more phase-modulated information signals, and which includes means for modulating carriers of different frequencies with such information signals and the reference signal preparatory to mixing the modulated carriers and recording them on a wire recorder, or other single-channel recorder. As will be apparent, with such an arrangement a large number of variables may be recorded simultaneously on a single-channel recorder, which is an important feature of the invention.

Another object is to provide such a system including switching means for modulating a carrier with one of two or more phase-modulated information signals so that two or more variables may be recorded alternatively, or sequentially.

Still another object is to provide an information recording and reproducing apparatus which includes electrical actuating means for producing variations in a quantity representative of a variable that has been recorded in the form of a phase-modulated information signal, and which includes phase-demodulating means responsive to phase variations between the reference signal and the reproduced information signal for operating the actuating means to vary the quantity controlled thereby as a function of phase variations between the reference signal and the reproduced information signal. Another object in this connection is to provide a phase-demodulating means which includes means for generating a cyclical, secondary information signal representative of the reproduced quantity, which includes phase-modulating means for varying the phase of the secondary information signal with respect to the reference signal as a function of variations in the quantity controlled by the actuating means, and which includes phase-discriminating means for applying to the actuating means an actuating signal variable with phase differences between the original, reproduced information signal and the phase-modulated, secondary information signal.

Another object is to provide a system wherein the phase-modulating means embraced by the phase-demodulating means includes a synchro having its field windings connected to the reproducing means through a phase-splitting means for splitting the reproduced reference signal into different phases which are applied to the respective field windings, and having its rotor connected to the actuating means referred to in the preceding paragraph.

A further object is to provide an information reproducing system which is capable of translating a plurality of recorded phase-modulated information signals into quantities representative of the original variables, such information signals being impressed on carriers of different frequencies as hereinbefore discussed. More particularly, an object in this connection is to provide filter means for separating the different carriers, demodulating means for extracting the information signals from their carriers, and a plurality of phase-demodulating means of the character hereinbefore described for translating the extracted information signals into quantities representative of the original variables.

Another object is to provide a system which is capable of extracting and phase-demodulating the information signals simultaneously if such signals were simultaneously recorded, or which is capable of extracting and phase-demodulating the information signals alternatively or sequentially if the information signals were alternatively or sequentially recorded.

Still another important object of the invention is to provide an information recording and reproducing system which includes means for absolutely positioning or synchronizing two or more reproduced quantities so as to obtain precisely the same relationship between such quantities as obtained between variables of which such quantities are representative. Another object in this connection is to provide a system which includes cascades of phase-modulating and phase-demodulating means for accomplishing this result, the elements of the cascades preferably being synchros having their rotors so geared, or otherwise connected, together that the maximum phase excursion in the last synchro in the cascade is less than one-half cycle for the maximum required rotational range of the rotor of the first synchro in the cascade.

Hereinbefore, the elements of the recording portion of the recording and reproducing apparatus of the invention have been considered separately from the elements of the reproducing portion thereof as a matter of convenience. However, an important object of the invention is to provide an apparatus wherein various elements participate in both the recording and reproducing functions and thus perform dual functions, thereby materially reducing the number of elements in the system. A related object is to provide means wherein imperfections in the phase-modulating and demodulating elements similarly affect the recorded and reproduced phase variable information signal and the secondary information signal, representative of the reproduced quantity, hereinbefore described, so that such imperfections are cancelled or diminished in effect. Another related object is to provide switching means for selectively connecting such dual-function elements in the recording and reproducing portions of the apparatus as required, such elements being connected in the recording portion of the apparatus during recording and being connected in the reproducing portion of the apparatus during reproduction.

Another object of the invention is to provide a single-beam spectrophotometer having a slit drive means, having radiation detection and amplifying means for producing an output signal, and having control means operatively connected to the slit drive means for so varying the slit width in response to variations in the output signal as to maintain the output signal substantially constant. The present invention can be used to so vary the slit width on a standardizing run, and can be used to duplicate such variations in a play-back or operating run in which a sample is disposed in the beam to influence the output signal. This arrangement permits obtaining absorption spectra directly in transmittancy as a function of wavelength without any necessity for tedious calculations and without any necessity for the employment of a dual, matched-beam instrument, which is an important feature.

Another object is to provide a spectrophotometer having a wavelength drive means and a slit drive means, and having control means responsive to geometric slit width for moving the dispersing means controlled by the wavelength drive means at a rate proportional to geometric slit width so as to obtain equal scanning time for each spectral slit width. This feature permits obtaining maximum operating efficiency by traversing each spectral slit width in a time proportional to the response period of a recording system associated with the spectrophotometer, which is an important feature.

Another object is to provide a spectrophotometer provided with a dispersing means having, as is conventional, a wavelength-position relationship which is a non-linear function, the spectrophotometer being provided with a wavelength drive means for the dispersing means, being provided with movable recording means and drive means therefor, and being provided with control means operatively connected to the recorder drive means and the wavelength drive means for translating the nonlinear function characteristic of the dispersing means into a linear function with respect to wavelength. This feature permits recording transmittancy, or other suitable variable, with respect to wavelength, wave number, or the like, with a linear scale for the latter variable, which is an important feature.

Another object is to provide an improved spectrophotometer having a radiation source, radiation detection and amplifying means for generating an output signal and a pair of monochromators, all optically connected in series, one of the monochromators including an entrance slit adapted to receive radiation from the radiation source and including a dispersing means adapted to receive radiation from the entrance slit, and the other monochromator including a dispersing means adapted to receive radiation from the dispersing means of the first monochromator and including an exit slit adapted to receive radiation from its dispersing means and to admit such radiation to the output signal generating means. Other objects of the invention reside in the particular arrangement of the elements and the structural details of such a monochromator.

The foregoing objects and advantages of the present invention, together with various other objects and advantages thereof which will become apparent, may be attained with the exemplary embodiments of the invention which are illustrated in the accompanying drawings and which are described in detail hereinafter. As a matter of convenience, the information recording and reproducing apparatus of the invention will be considered first in a general way with reference to recording movements of mechanical elements and to reproducing such movements of the same elements, but without reference to any specific applications of the apparatus. Thereafter, the recording and reproducing apparatus will be considered as applied to drives for machine tools and as applied to the wavelength and slit drives of spectrophotometers for the purpose of illustrating practical applications of the apparatus.

Also, since many of the elements of the electrical circuits incorporated in the recording and reproducing apparatus of the invention are conventional, the drawings are largely schematic, and in view of the dual functions of many of the components in recording and reproducing, the apparatus is illustrated in separate, correlated schematic diagrams in many instances. Referring to the drawings.

Figure 1:
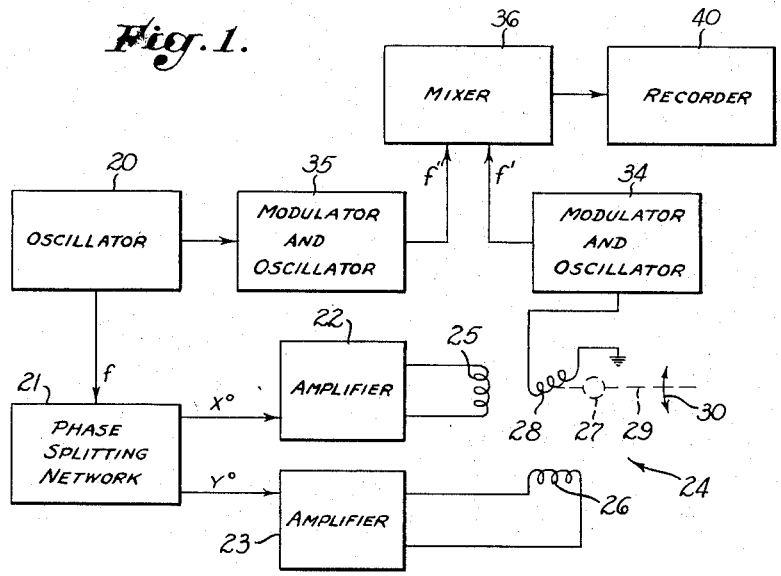
Fig. 1 is a diagrammatic view of a recording apparatus or system of the invention which is capable of recording a single variable.

Referring first to Fig. 1 of the drawings, illustrated therein is an embodiment of the invention which is adapted to record a mechanical movement, exemplified as rotation of a shaft. The criterion of shaft-position measurement is phase modulation of a cyclical information signal to obtain a variable-phase or phase-modulated information signal that varies in phase with respect to a cyclical reference signal substantially in proportion to the position of the shaft.

Considering the recording apparatus of Fig. 1 in more detail, a master generating means, exemplified as an oscillator 20, is provided to generate a reference signal of any predetermined frequency of $f$ C. P. S. and is connected to a phase-splitting network or means 21 to derive at least two voltage components therefrom in out-of-phase relationship, such components being indicated as X° and Y°. Preferably, the X° component is substantially in phase with the voltage provided by the oscillator 20 and the Y° component is 90° removed therefrom, but it is contemplated that any phase angle may be developed for each component with any operable phase difference between the two. The two components may be amplified, if necessary, by amplifiers 22 and 23 and are applied to a phase-shifting device or phase modulator indicated by the numeral 24. Illustrative of such a device is a two-phase self-synchronous motor commonly referred to as a synchro or Selsyn. It is to be understood that in the event that more than two out-of-phase components are employed, a suitable multiphase or polyphase synchro may be employed.

The oscillator 20 may provide a reference signal of various forms depending upon the desired application, ranging from sinusoidal to square waves, or any distinct pulse pattern. It may be present or remote; for example, the reference frequency may be supplied by the A. C. power mains. The phase-splitting network 21 will be adapted to derive the phase derivatives therefrom and may be a passive network or an active network, with lumped or distributed parameters, as dictated by convenience and by the nature of the reference signal.

The illustrated synchro 24 comprises two stator or field windings 25 and 26, in conventional three or four wire connection, that are connected to the amplifiers 22 and 23 respectively. The interaction of the magnetic fields created by the windings 25 and 26 provides a resultant field flux which may be represented by a vector that is rotating at a frequency commensurate with the frequency of the oscillator 20. Disposed within the rotating magnetic field is the rotor 27 of the synchro 24 having a winding 28 thereon for transformer interception of the rotating magnetic field to induce a voltage therein. This voltage may be referred to as a cyclical information signal, and the windings 25, 26 and 28 act as a generating means therefor. A shaft 29 is physically connected to the rotor and is freely rotatable, manually or otherwise, in either direction, as indicated by the dual arrows 30. It will be obvious that the functions of field and rotor coils may be interchanged, by the use of two rotor coils and one field coil, or that other functionally equivalent elements may be substituted for the synchro, without departing from the spirit of the invention.

The rotor winding 28 is preferably connected to a modulator and oscillator 34 whereby the applied information signal is used to modulate a carrier frequency of $f'$ C. P. S. Similarly, the master oscillator 20 is preferably connected to a modulator and oscillator 35 whereby the applied reference signal is used to modulate a carrier frequency of $f''$ C. P. S. The resultant carriers and side-band frequencies are simultaneously directed to a mixer 36 wherein they are linearly mixed, and the complex wave form resulting therefrom is applied to a single-channel recorder 40 that is operative to record or memorize the waveform as a function of time.

The recording medium may be of any variety of conventional device, ranging from a needle or stylus to rout a continuous but variable groove in a substance, to describing a wave form upon a photo-sensitive film. Preferably, a wire or magnetic tape recorder operable within the selected frequency range is used, such range being chosen within the audio-frequency spectrum for convenience only and not due to operative restrictions.

For a predetermined position of the shaft 29 the rotor winding 28 occupies a fixed space relationship with respect to the rotating magnetic field and the winding 28 will have an A. C. voltage induced therein of a frequency commensurate with the frequency of the magnetic field rotation. The aforementioned predetermined shaft position may be assumed to have been selected so that the voltage induced in the rotor winding is in phase with the reference signal generated by the master oscillator 20. Selection of a different position of the rotor shaft 29 will result in a voltage being induced in the rotor winding having a phase angle as a function of the difference between the two positions. Accordingly, the position of the shaft as a variable is translated into a cyclical information signal having a phase deviation from the reference signal as a function of the variable, the rotor thus acting as a phase-modulating means as it varies the position of the rotor winding relative to the field windings. Design considerations may render this phase deviation proportional to, or nonlinear with respect to a variable displacement or rotation, as desired. The characteristic action of the synchro 24 therefore may be designated as phase modulation, and the synchro may accurately be defined as a phase modulator.

Since the phase of the cyclical information signal is altered by a change of position of the shaft 29, with respect to the signal on either field coil, the latter being in constant phase relation to the reference signal, a change of shaft position will produce a change of phase deviation or phase excursion in appropriate direction with respect to the reference signal. Hence, the instantaneous phase excursion is a function of the instantaneous value of the variable, here taken in exemplary form as the shaft position, and the rate of change of phase is a function of the rate of change of the variable.

While a single-channel recording means 40 has been illustrated, the reference signal and the phase-modulated information signal thus generated may be individually stored in parallel channels on a recorder, for instance, on tracks side by side on a magnetic tape, or on separate synchronously operating recorders. However, a single-channel recording means lends simplicity to operation and provides reliable accuracy in time relation between the two signals. As hereinbefore indicated, a wire recorder 40 may be utilized to memorize the signals which have been used to modulate carriers of higher but different frequencies such as the $f'$ and $f''$ frequencies shown. The signals are thus simultaneously stored in the prototype run upon the recording means and rendered available for subsequent use.

Figure 2:
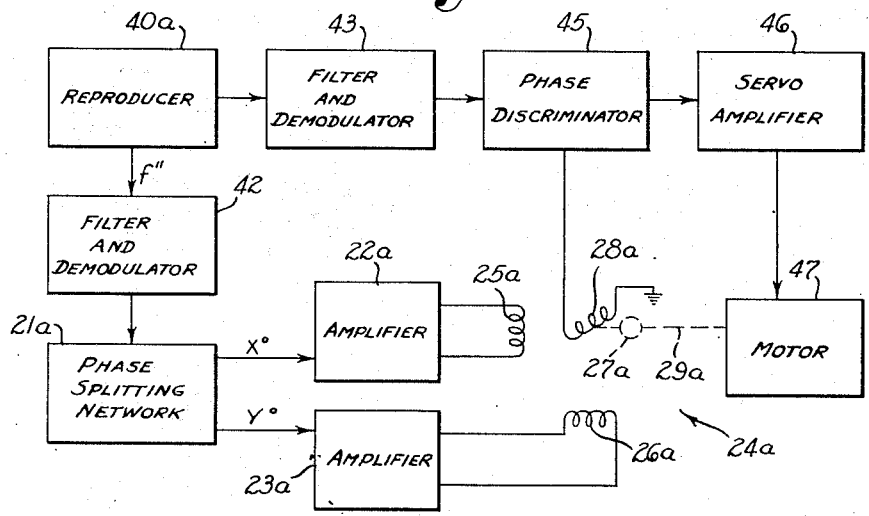
Fig. 2 is a diagrammatic view of a reproducing apparatus or system of the invention which is capable of reproducing a single variable, Fig. 2 being a counterpart of Fig. 1.

Fig. 2 is a diagrammatic representation illustrative of a reproducing apparatus for use in a playback or reiteration run wherein the intelligence memorized by the recorder is utilized to reproduce the variable as originally manipulated on the recording run. In many respects the electrical components used in the recording run may be used on reproduction and when so adapted in the example, the same numerals will be used. In the absence of an absolute positioning system, which will be described hereinafter, the recorder may be reversed and the complex voltage used to reproduce the original variable in reverse form so as to maintain synchronism between the two signals while returning to the initial or starting position. Thus, for exact reproduction or reiteration of the original variable, the recorder is returned to the initial or starting position and, beginning therefrom, operates at substantially the same speed as in the recording run for repetition of the sequence of rotations of shaft 29a in substantially the same chronological order as obtained for shaft 29 during recording.

Referring to Fig. 2, the recorder or recording means 40a, now acting as a reproducer or reproducing means, is operated to reproduce the memorized wave form and to apply it to a filter and demodulator 42 and a filter and demodulator 43 which are designed to pass only the reference signal and the phase-modulated information signal, respectively. The filters are of the band pass type with characteristics sufficiently wide to accommodate the carriers $f''$ and $f'$, respectively, and the associated sidebands produced by the signals. The circuit may contain phase corrector networks to compensate for phase shift differences between the reference signal and the variable information signal channels, resulting from inherent characteristics of the electrical networks, as by incorporation in filter 43. Such phase corrector networks may also be required in the reproducing embodiments to be discussed hereinafter.

The carriers are then demodulated or detected whereby the original signals are extracted and reproduced in precisely their original relationship. The reference signal is applied to a phase-splitting network or means 21a which derives two voltage components with a phase difference therebetween similar to that provided on the recording run. The out-of-phase components are applied to amplifiers 22a and 23a and thence to the synchro field windings 25a and 26a to provide a vector resultant magnetic field which rotates at a frequency similar to that in the prototype run. The synchro rotor winding 28a therefore has induced therein a voltage, hereinafter termed a secondary information signal, the phase of which is dependent upon the position of the rotor. As will be apparent, the phase of the secondary information signal varies relative to the reference signal as the rotor 27a rotates so that the rotor serves as a phase-modulating means for the secondary information signal.

The secondary information signal derived from the rotor winding 28a and the original, or primary, information signal are applied to a phase discriminating network or means 45 wherein the phases are compared, and the resulting error phase, or phase difference, provides an output or actuating signal the magnitude and polarity of which is a function of the difference in phase between the applied signals. The output is directed to an amplifier 46, whereby the power is increased for subsequent application to an actuating means which is exemplified as a motor 47 and which is connected or geared to the shaft 29a of the rotor 27a. Due to the mechanical coupling the synchro rotor is caused to rotate in such a direction as to maintain a phase balance within the discriminator. Effectively, therefore, there is provided a follow-up or servomechanism loop comprising the synchro rotor, the phase discriminator, the amplifier and the motor. The amplifier and motor may accordingly designated as servocomponents. Thus, as the two information signals vary in phase, the servomotor 47 positions the synchro rotor to maintain a phase balance in the discriminator, and as an incident of balance the shaft 29a is caused to assume substantially the positions and rate of change thereof as originally established in the recording run.

It will be noted that the phase-splitting means 21a, the synchro 24a and the phase-discriminating means 45 form a phase-demodulating means which applies to the motor 47 an actuating signal which is a function of phase differences between the reproduced reference signal and the reproduced, phase-modulated information signal.

Figure 3:
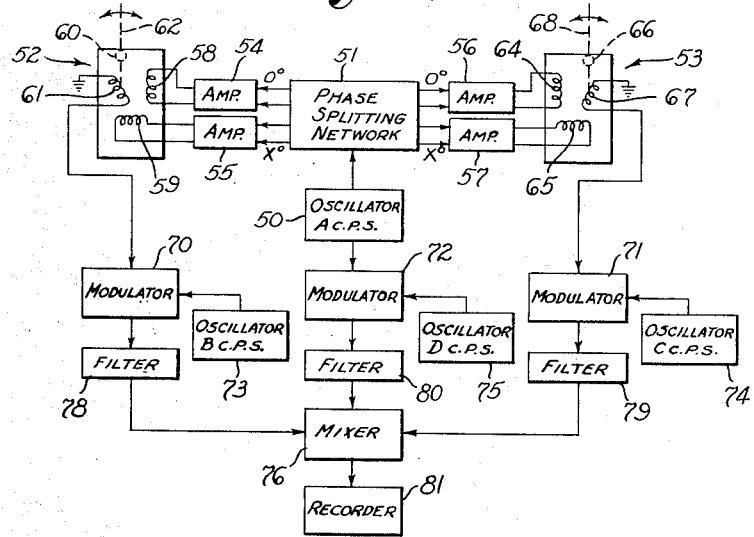
Fig. 3 is a schematic view which is similar to Fig. 1, but which illustrates a recording apparatus for recording at least two variables.

The above-described basic form of recording and reiteration apparatus is applicable to reproduction of a single memorized variable in a time sequence determined by recording and reproduction speed. The same mode of operation may be utilized to reproduce a plurality of variables in precise relation to one another. Fig. 3 is an electrical schematic of an apparatus embodying the present invention that is illustrative of a recording or prototype run of two variables, and it will become apparent that any plurality of variables may be recorded by convenient addition to the components shown.

A master generating or reference signal source means, exemplified as an oscillator 50, is provided to generate a reference voltage signal of a frequency of A. C. P. S. and is connected to a phase-splitting network 51 wherein the voltage is split into two components, one of which may be in phase with the A. C. P. S., indicated as 0°, and the other of which may be X° displaced therefrom. These voltage components are directed to two phase modulating means, illustrated as synchros 52 and 53, through amplifiers 54 to 57 in the manner hereinbefore indicated in the basic description.

The synchro 52 comprises two stator or field windings 58 and 59, a rotor 60, a rotor winding 61, and a shaft 62 that is physically connected to the rotor 60. Similarly, the synchro 53 comprises two field windings 64 and 65, a rotor 66, a rotor winding 67, and a shaft 68 that is connected to the rotor 66. The rotor windings 61 and 67 are electrically connected to modulators 70 and 71, respectively, and the master oscillator 50 is connected to a modulator 72. The modulators 70, 71 and 72 are provided with oscillators 73, 74 and 75, respectively, providing carrier frequencies of B. C. P. S., C C. P. S., and D C. P. S., respectively. The carrier frequencies may be conveniently selected from the spectrum with appropriate spacing so that, when modulated by their respective signals, such sidebands as are required for the conveyance of the phase variations will not overlap. Each modulator is connected to a mixer 76, the respective channels first being filtered, if necessary, by filters 78, 79 and 80. The complex voltage is applied to a recorder or recording means 81 wherein the wave pattern is stored or memorized.

In operation, the shafts 62 and 68 may be manipulated independently of each other, or in any desired relation, exemplary relations therebetween being discussed hereinafter. They may be manipulated manually or otherwise at various rates of rotation, but not equalling or exceeding the rate of rotation of the magnetic vector in the synchro when the directions of rotation are the same. The position and rate of change of position of each shaft is used to phase modulate an information signal induced in the corresponding rotor winding commensurate with the position and rate of change of position of the shaft. To provide proper segregation of the two information signals as well as the reference signal, the signals are used to modulate the carrier frequencies, the carriers being capable of segregation upon reiteration. Thus, there is provided a means to memorize or record a plurality of variables with synchronized relation to one another as well as with a reference that may be utilized to display the original time variations of the variables.

Figure 4:
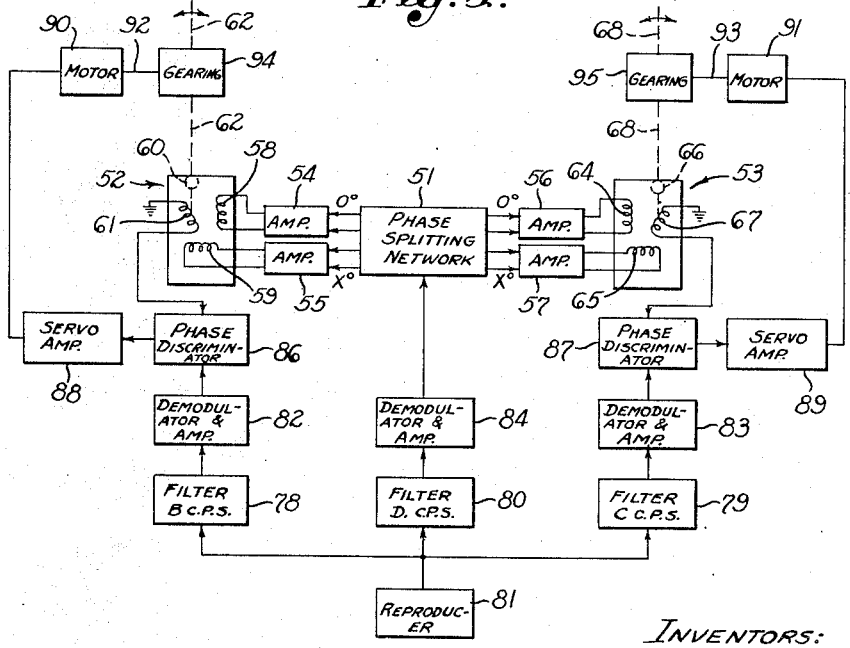
Fig. 4 is a schematic view similar to Fig. 2, but illustrating a reproducing apparatus capable of reproducing at least two variables, Fig. 4 being a counterpart of Fig. 3.

Fig. 4 illustrates the reproduction or playback apparatus corresponding to the recording apparatus of Fig. 3. In like manner, as hereinbefore described in Fig. 2, the recorder 81, which now acts as a reproducer or reproducing means, applies the composite voltage to the three filters 78, 79 and 80, wherein the carriers B C. P. S., C C. P. S., and D C. P. S. are passed with their associated sidebands. The channels are separately demodulated and amplified by demodulators and amplifiers 82, 83 and 84, whereupon the two original, or primary phase-modulated information signals and the reference signal are reproduced in their original forms. The reference signal is directed to the phase-splitting network 51 and is divided into the 0° and X° components, which are applied to the synchro field windings to provide a rotating and synchronized magnetic flux in each of the synchros 52 and 53. The rotor windings 61 and 67 will have induced therein voltages or secondary information signals having phase angles as functions of the instantaneous positions of the rotors 60 and 66. The phase-modulated secondary information signals are directed to respective channel phase discriminators 86 and 87 wherein these signals are compared to the phase-modulated, primary information signals emanating from the respective demodulators 82 and 83. The differences in phase between the compared signals produce error voltages or actuating signals which are amplified by amplifiers 88 and 89 and directed to servomotors 90 and 91 which are mechanically coupled by shafts 92 and 93 through gearings 94 and 95 to the synchro rotor shafts 62 and 68. A servomechanism is thus provided for each channel, whereupon the motors will drive the synchros in such directions and at such rates as to reproduce whih high precision the original variables delineated in their interrelations and in time relation dependent upon the speed of recording and of reproduction. The motors 90 and 91 may be geared to the synchro rotors in any appropriate ratio to provide maximum operating efficiency. Therefore, the shafts 62 and 68 may operate at speeds proportional to the motor speeds.

Figure 5:
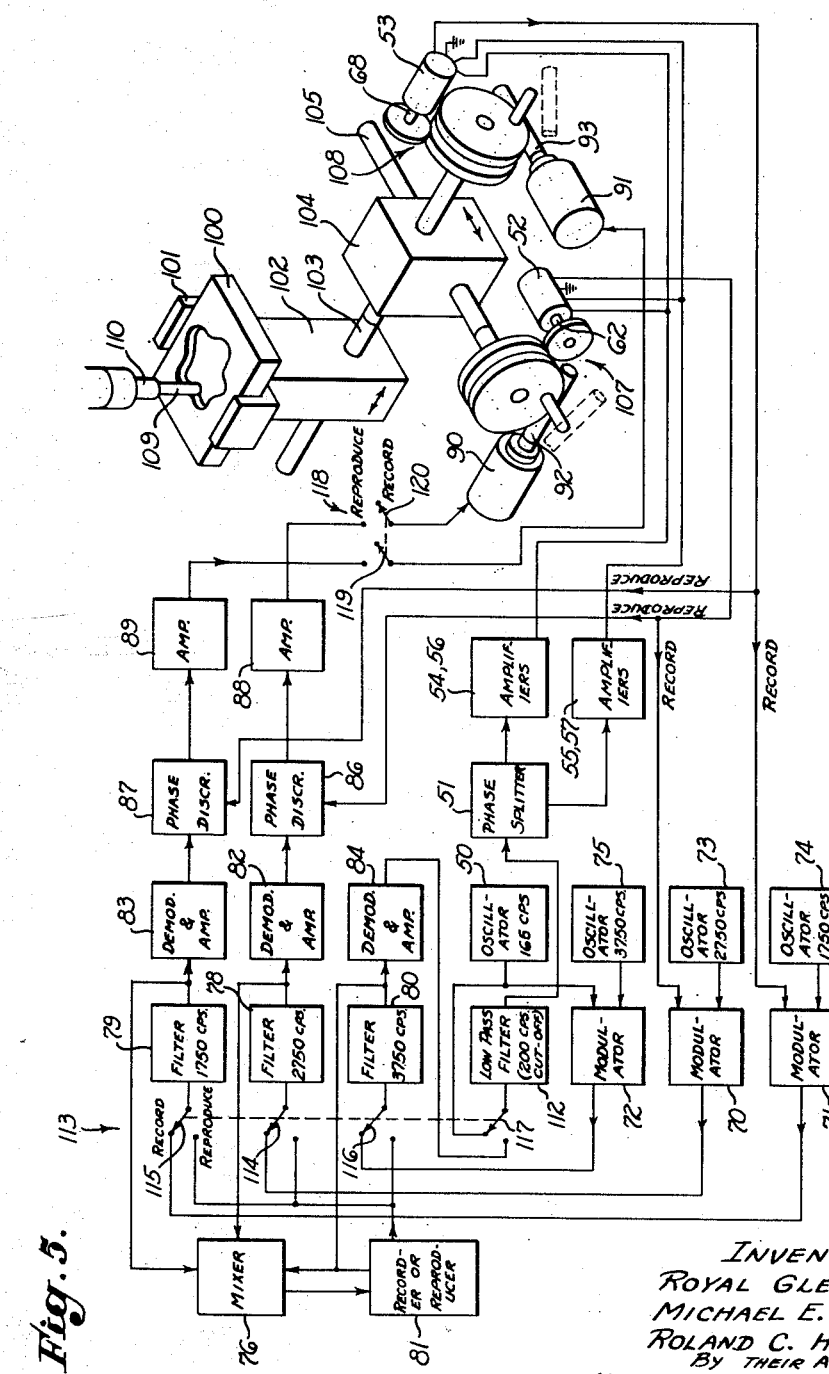
Fig. 5 is a composite diagrammatic view of a recording and reproducing apparatus of the invention as applied to a machine tool, Fig. 5 being, in effect, a composite of of Figs. 3 and 4.

Fig. 5 is representative of the many hereinbeforementioned applications of the recording and reproducing, or memory, system, the memory system being therein applied to a milling machine having two variables, for example, longitudinal and transverse motion. In precision fabrication of machined parts, it is most desirable to maintain the same close tolerances on all parts so as to render them readily interchangeable for cooperation with other components. The present invention is capable of providing accuracy within close limitations and duplication thereof for any desired number of similar parts without the necessity of skilled labor for continuous manual manipulation. As one example, a pattern may be created of a material that is easily workable.

As shown diagrammatically in Fig. 5, a pattern 100 may be mounted in a chuck 101 that is carried by a carriage 102 having a longitudinal lead screw 103 therethrough for producing longitudinal motion of the pattern. The lead screw 103 extends through and is carried by a block 104 having a transverse lead screw 105 extending therethrough for producing transverse movement of the pattern. The screws 103 and 105 are geared, as indicated by the numerals 107 and 108, respectively, to the shafts 62 and 68 of the synchros 52 and 53, and are also releasably geared to the shafts 92 and 93 of the motors 90 and 91 by the worm and wheel arrangement shown. The lead screws are adapted to be rotated by an operator to produce a longitudinal and transverse motion of the pattern 100 with respect to a follower 109 that is mounted on an arbor 110 for operative association with the pattern.

In so far as the memory system of the invention is concerned, Fig. 5 is a composite representation of the recording and reproducing systems illustrated in Figs. 3 and 4, but simplified and exemplifying dual use of various of the components in the prototype and reiteration runs. The reference numerals used herein are the same as those utilized in Figs. 3 and 4 for similar elements. As an indication of a practical application of the memory system, operative values, which are not intended to be limiting, are shown in certain of the units, e. g., the master oscillator 50 provides a frequency of 165 C. P. S. Additionally, employed in this embodiment is a low pass filter 112 that serves to pass frequencies under 200 C. P. S. and to suppress higher frequencies, especially any higher order harmonics of the 165 C. P. S. fundamental. Other illustrative values are also shown in Fig. 5.

A gang switch 113 having single-pole, double-throw elements 114, 115, 116 and 117 is provided for communicating the reference signal and information signals to the filters 78, 79, 80 and 112, respectively. As shown in the drawing, the switch is in the recording position wherein the phase-modulated information signals from the rotors of the synchros 52 and 53 are directed by the switch elements 114 and 115 to their respective filters 78 and 79 and thence to the mixer 76 and recorder 81, wherein the reference signal is directed by the switch element 116 to the filter 80 and thence to the mixer and recorder, and wherein the reference signal is directed by the switch element 117 to the phase splitter 51. On reproduction or playback the gang switch 113 is moved to the playback position whereby the composite voltage of the recorder 81 is applied to the filters and demodulators in a manner which will be apparent from Fig. 5. To complete the playback circuit to the servomotors 90 and 91, a switch 118 having single-pole, single-throw elements 119 and 120 provides a means to actuate the motors only upon playback.

In operation, the pattern 100 to be duplicated is placed in a predetermined position in the chuck 101, and the follower 109 is depressed vertically until disposed laterally opposite the contour of the pattern. The shafts 92 and 93 of the servomotors 90 and 91 are declutched, as indicated in phantom, thus rendering the lead screws 105 and 103 freely rotatable. The switches 113 and 118 are placed in the recording position and power is applied to the electrical components. The operator, by manual manipulation of the lead screws 103 and 105, causes the pattern 100 to be brought into surface contact with the follower 109 and thereafter moves the pattern longitudinally and transversely by means of the handwheels so that the follower 109 continuously follows the contour of the pattern. Throughout this prototype run the rotors of the synchros 52 and 53 are being rotated through the gear couplings 107 and 108 to provide information signals having phases indicative of the synchro-rotor positions. These phase-modulated information signals represent the variables to be recorded in their relation to the reference signal generated by the oscillator 50, and all signals are memorized in the recorder 81 as hereinbefore described.

On reiteration or playback, the pattern 100 is replaced by a blank to be machined, and the follower 109 is replaced by a suitable cutting tool, such as an end mill driven by the arbor 110. The lead screws are returned to the initial starting position, and the recorder is appropriately synchronized therewith, either manually or automatically with an absolute positioning system as discussed hereinafter, or automatically by operating the system in reverse as hereinbefore discussed. The cutting tool is then depressed into the cutting position. Also, it is necessary that the shafts 92 and 93 be clutched to the lead screws. The switches 113 and 118 are placed in the playback position. When power is applied to the electrical components, the servomotors 90 and 91 become operative to drive the lead screws 105 and 103 to reproduce the original manual manipulation by the operator, whereby the blank that was substituted for the pattern 100 is machined to accurately duplicate the pattern.

The recorded signals may be utilized many times so that any desired number of parts may be fabricated exactly duplicating the original pattern. It is not necessary that a pattern be employed as an original design, and the operator may actually cut or mill a piece of work by reference to design specifications, the various positions of the variables being recorded simultaneously as he does this. The intelligence or information thus compiled may be used subsequently for production of identical work pieces. In the above-described operation, if the lead screws are returned manually, or under manual control, to their original starting positions subsequent to recording and prior to playback, it is possible that the synchros may be one or a plurality of revolutions in fixed out-of-phase relationship or phase error with respect to the reference signal. Revolution counters, or other visual aids, not shown, may be applied to the apparatus to provide a means for accurate manual alignment or synchronizing. However, the employment of automatic means for positive or absolute positioning, or reversal of the operation of the system to attain the precise starting positions, precludes the possibility of error and, as well, minimizes laborious adjustments.

Figure 6:
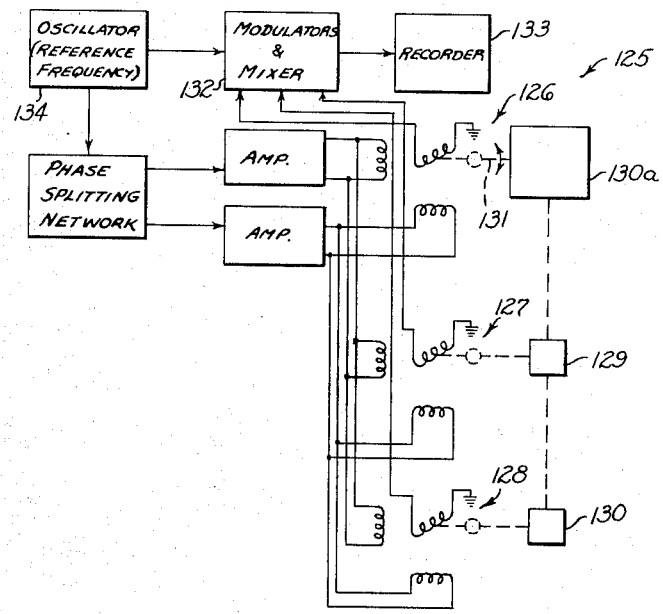
Fig. 6 is a diagrammatic view of a recording apparatus of the invention which is capable of providing absolute positioning or synchronizing of a variable with respect to a reference.

Fig. 6 illustrates an absolute position-sensing apparatus of the invention for recording a single variable in which a plurality of related information or intelligence signals are generated as a function of the desired variable with respect to time. The related information signals are provided by a series or cascade of phase modulators 125, the drawing illustrating three similar synchros 126, 127 and 128 geared or otherwise connected together by a driving means which drives the rotors thereof at progressively lower speeds. In the order of speed reduction the synchros 126, 127 and 128 may be designated as fine, medium and coarse, respectively, the last-mentioned synchro being limited to a maximum positioning displacement of its rotor of less than a predetermined amount, e. g., 180° in a two-phase synchro, throughout the entire range of displacement of the fine synchro 126. In the particular construction illustrated, the rotors of the synchros 127 and 128 are connected to gear reduction units 129 and 130, respectively, and thence to a gear unit 130a to which the rotor of the synchro 126 is also connected, as by a shaft 131. With this arrangement, the coarse synchro 128, i. e., the lowermost in Fig. 6, provides an approximation of the information signal. The next adjacent synchro 127, the medium synchro, is in step-up gear ratio to the coarse synchro and similarly the fine synchro 126 is in step-up gear ratio to the medium synchro. The gear ratios intermediate the pairs of synchros are selected so that for the maximum phase deviation or excursion of the fine synchro 126, the coarse synchro 128 does not deviate in excess of one-half electrical cycle, e. g., does not rotate in excess of 180° for a two-phase synchro, and the maximum positioning error in any synchro does not produce in the next faster rotating synchro a corresponding error in excess of one-half electrical cycle, e. g., 180° of rotation in a two-phase synchro. When the variable is introduced, as by rotation of the shaft 131 of the fine synchro, all of the synchro rotors operate in unison to provide a plurality of information signals which are functions of the variable and which are individually channeled and modulated by carriers of different frequencies in a composite modulator and mixer 132 and then communicated to a recorder 133 for memorization of the complex wave form, the reference signal provided by an oscillator 134 being simultaneously modulated and recorded. As previously discussed, the reference signal is also applied to the synchro fields in split-phase form.

Figure 7:
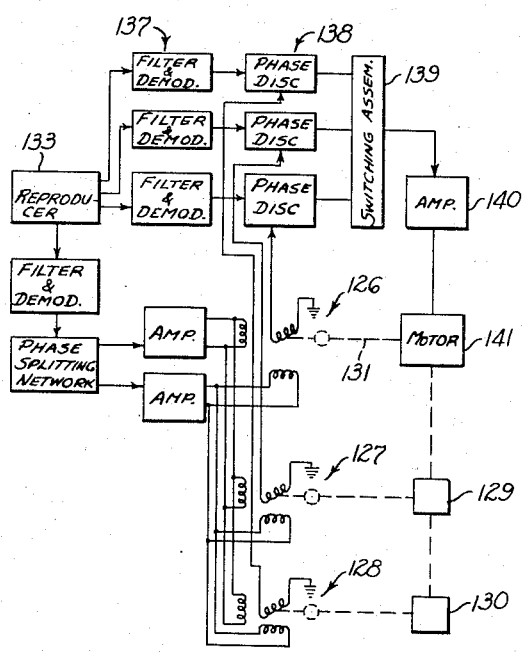
Fig. 7 is a diagrammatic view of a reproducing apparatus for providing absolute positioning or synchronizing of a variable with respect to a reference, Fig. 7 being a counterpart of Fig. 6.

Fig. 7 is the correlative playback apparatus corresponding to the recording apparatus of Fig. 6. The recorder 133, after being returned to its initial starting position, is set into operation and acts as a reproducer to apply the composite voltage wave to a bank 137 of filters and demodulators wherein the individual but dependent phase-modulated information signals are derived or extracted in original form. A bank 138 of phase discriminators receives the original information signals, as well as the secondary information signals from the synchro rotors, and respectively phase compares them with the secondary information signals, the resulting phase-difference actuating signals being directed to a switching mechanism or switching means 139, that may be manual or self-actuating. In manual operation the switching mechanism is displaced to communicate the actuating signal derived from the phase discriminator of the coarse synchro 128 to a servo-amplifier 140 and thence to a motor 141 which is coupled to the synchros as shown diagrammatically. Assigning the position-sensing or actuating signal of the slowest synchro to the motor 140 causes the coarse synchro to be driven in such a direction as to reduce the phase error in the associated discriminator whereby a state of equilibrium is reached for the coarse synchro to obtain approximate positioning. The switching mechanism may then be operated to assign the actuating signal or position-sensing function derived from the phase discriminator of the medium synchro 127 to the motor 141 whereupon a closer approximation of the original shaft position is established. In a similar manner the switch 139 assigns the position-sensing function derived from the phase discriminator of the fine synchro 126 to the motor 141 for precise positioning accuracy. Thus, there is provided a means to produce in the synchro stages a successively closer approximation to obtain exact positioning accuracy in duplication of the prototype run, and any initial position error within the range of excursion may be reduced effectively to negligible proportions.

As hereinbefore indicated, the switching mechanism 139 may be self-actuating whereby it automatically assigns a control function to any synchro, the rotor signal phase of which, as compared to the corresponding original information signal, is in phase error by more than a predetermined amount. If more than one is in error, the coarsest or slowest synchro will take precedence, utilizing selective switching means well-known in the engineering art, and will only relinquish control to the next finer when its error has been rendered negligible and when accordingly the next finer synchro is within 180° of its correct position. Thus, in the event of a positioning error that may have been caused by accident, such as interruption of the power source, or otherwise, absolute positioning may, at any time, e. g., at the beginning of or during a reiteration run, be attained with precision. The absolute positioning system as described is versatile in that it can be made to cover any desired control range by including as many synchros as desired in cascade operable through suitable additional gear reduction units while retaining the high position accuracy of the fastest or finest synchro.

As hereinbefore pointed out, the information recording and reproducing, or memory, system of the invention is also applicable in spectrometry, which is a powerful tool in chemical analysis. A spectrophotometer is a device which is designed to provide qualitative and quantitative analyses of substances and, in essence, directs electromagnetic radiation from an energy source through a substance to be analyzed, the radiation frequencies passing therethrough being dispersed and variable so that the transmittancy of the substance with respect to wavelength may be determined. Standard curves of transmittancy versus wavelength have been compiled for numerous pure compounds, being used for reference when analyses of unknown substances are being made. However, with many spectrophotometers, an ordinary spectrogram is usually obtained, and the conversion thereof into readings of direct transmittancy for different wavelengths is a tedious and time-consuming operation. A most desirable result, therefore, would be to produce directly a graph of transmittancy versus wavelength, such a graph preferably having a linear ordinate in terms of wavelength and a linear abscissa in terms of transmittancy. Such a graph may be directly observed for determination of the constituents of the sample substance undergoing examination. To this end the features of the invention discussed in the following paragraphs are directed.

Figure 8:
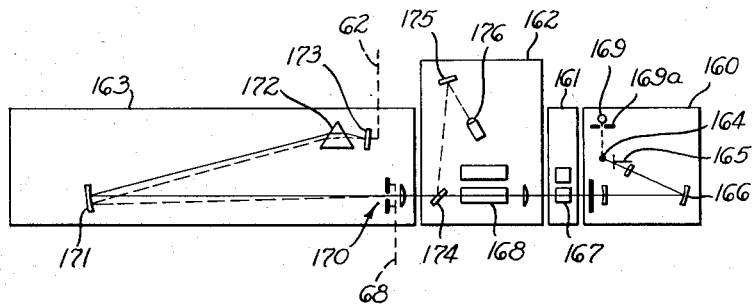
Fig. 8 is a diagrammatic view of a spectrophotometer to which the information recording and reproducing apparatus of the invention may be applied for the purpose of controlling the slit and wavelength drives of the spectrophotometer.

Fig. 8 is a diagrammatic illustration of a spectrophotometer which will be described only in a general way, being described in detail and various features thereof being claimed in applications Serial Nos. 722,038, now Patent No. 2,607,899, and 722,039, now Patent No. 2,562,525, both filed January 14, 1947. The spectrophotometer comprises four compartments 160, 161, 162 and 163 interconnected in light-tight relation except for communicating apertures intended to pass selected energy or radiation. The first compartment 160 includes an energy source, such as a Nernst glower 164, the radiation beam from which is interrupted at a low frequency, for example, ten times per second, by a rotating shutter 165. The beam is transferred by various optical elements, including a condensing mirror 166, through a liquid-cell region 167 and a gas-cell region 168 within the compartments 161 and 162, respectively. Cells in these regions are used to enclose the substance undergoing examination, the region depending upon the physical form of the substance as indicated by the cell name. A phototube 169 is provided to receive a component of the radiation through an adjustable shutter 169a to monitor the source 164 to maintain constant the output thereof. The radiation is focused to form an image of the source 164 upon an upper, entrance slit defined by a slit-forming means 170, and is collimated by a spherical mirror 171 and directed to a prism 172 whereupon it is dispersed and impinges on a rotatable mirror 173. Rotation of the mirror is produced by a shaft extending from the compartment 163, which shaft may for purposes of expediency be designated by the numeral 62 for correlation with Figs. 3 and 4. The beam is reflected by the mirror 173 and dispersed a second time by the prism 172 and is focused by the collimating mirror 171 upon the plane of an exit slit which is disposed beneath the entrance slit. The beam is then directed by a plane mirror 174 against a condensing mirror 175 which focuses an image of the exit slit upon a detector 176, which serves as an output-signal generating means and which may be a thermocouple, for example. The slit-forming means 170 is provided with a means for adjusting the widths of the slits formed thereby, as by a shaft extending from the compartment 163 and designated by the numeral 68 for correlation with certain of the foregoing figures.

Figure 9:
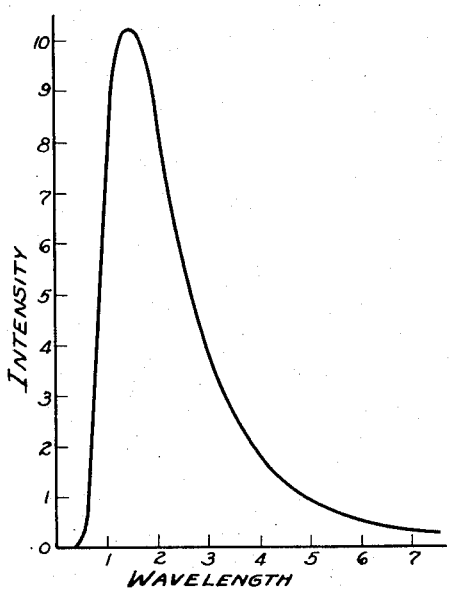
Fig. 9 is a curve of radiation intensity versus wavelength for a typical radiation source incorporated in the spectrophotometer of Fig. 8.

The movements of the shafts 62 and 68 in the spectrophotometer shown in Fig. 8 are the variables to be recorded and reproduced by the memory system of the invention. The significance of these variables will become more evident by referring to Fig. 9, which is a distribution curve of radiation intensity versus wavelength for a typical black body source of radiation, such as the source that is exemplified by the Nernst glower 164 in Fig. 8. The wavelength region illustrated extends from 0 to 7½ microns, but with certain characteristic prisms and other optical elements, the useful region may be materially extended. The thermocouple 176 of Fig. 8 is the output-signal generating means and provides a voltage signal proportionate to the radiation intensity focused upon it. As the shaft 62 is rotated, the useful wavelength spectrum is progressively applied to the thermocouple and the instantaneous voltage output thereof is a function of the instantaneous radiation intensity. Because of the varying intensity of the source, Fig. 9, and other factors, the output signal varies with wavelength even during a standardizing or prototype run. As will become apparent hereinafter, it is desirable to maintain the output of the thermocouple constant to provide a constant reference level for a complete traversal of the useful spectrum during a standardizing or prototype run, and this may be accomplished by continual adjustment of the slit-forming means 170 by rotating the shaft 68. Thus, during a scan of wavelength resulting from rotation of the mirror 173, the slit-width may be simultaneously adjusted to maintain the signal output of the thermocouple 176 constant to provide a constant reference level.

In using the memory system of the invention with the instant spectrophotometer, a dual-stage procedure is employed, the first stage of which may be designated as a standardizing or prototype run followed by a reiteration, graphing or playback run. In the former, the liquid-cell and gas-cell region may be empty, or contain known substances, and the wavelength region scanned by rotating the mirror 173 with continuous adjustment of the slit width 170 to provide a constant output of the detector or thermocouple 176. The instantaneous positions of the variables, i. e., the wavelength and slit-width drives, are recorded or memorized for subsequent reproduction. On reiteration, a sample material is placed within the beam and the recorded variables are reproduced, providing an output signal at the thermocouple which varies in direct proportion to the transmittancy of the introduced sample. The output signal may be suitably amplified and recorded. Accordingly, there is produced a record of transmittancy as related to wavelength which is independent of extraneous changes in radiation intensity with wavelength as the spectrum is traversed, such as the changes relative to wavelength which arise from the radiation source, for example.

It has been determined that maximum operating efficiency can be achieved by traversing each spectral slit-width in a time proportional to and preferably approximately equal to the response period of the amplifying and recording system. Traversal in less time causes unfaithful recording and correspondingly wastes available resolution while traversal in a much longer interval consumes time without improving the fidelity of the record. Therefore, maximum efficiency may be attained by scanning each spectral slit-width in a time proportional to the mentioned response period. Further, a constant scanning time per spectral slit-width may be achieved by rotating the mirror 173, Fig. 8, at a rate proportional to the geometric, i. e., physical, slit-width.

Figure 10:
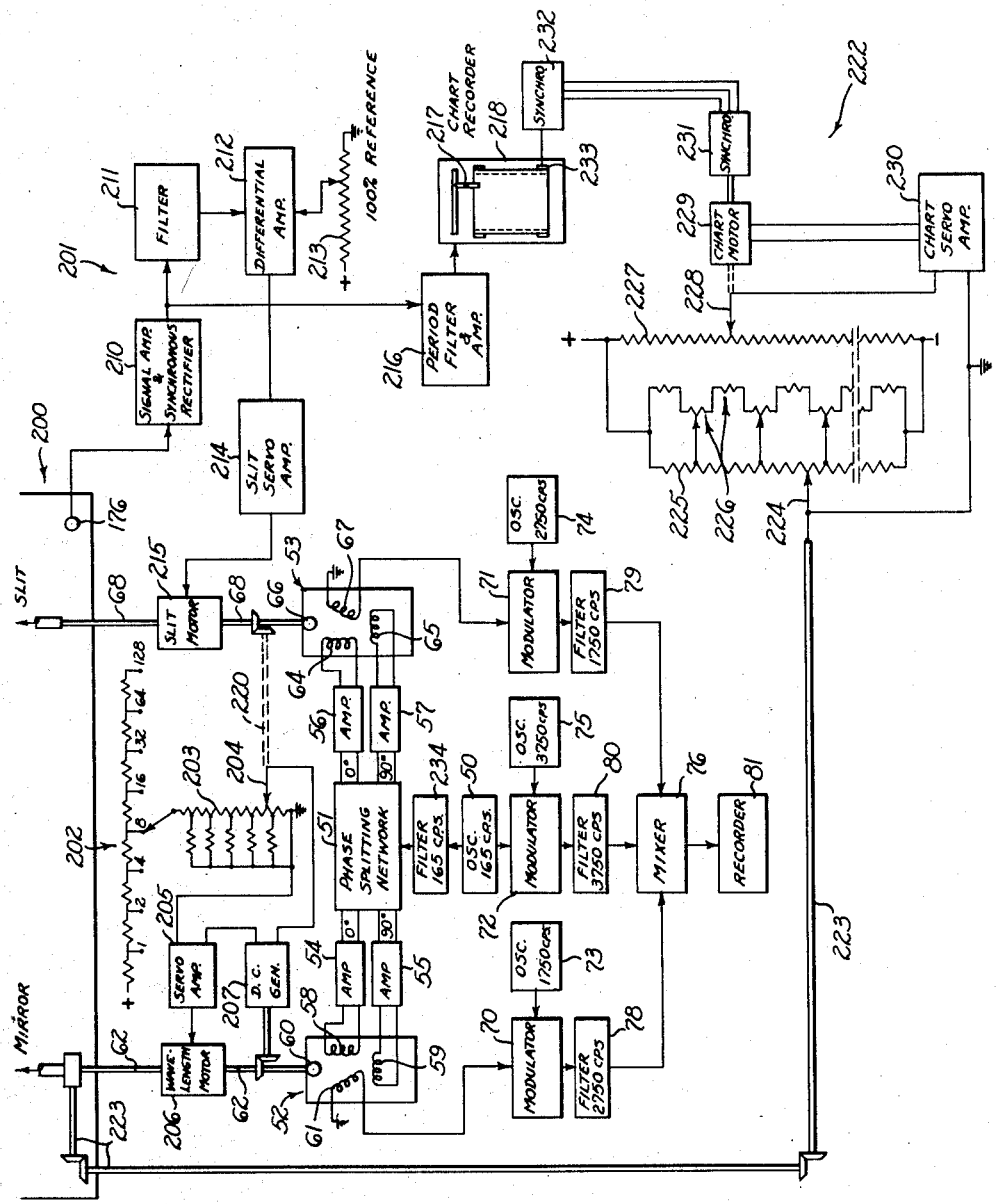
Fig. 10 is a diagrammatic view of a recording apparatus of the invention as applied to the spectrophotometer of Fig. 8, including a slit control means, a linear chart drive and a control means therefor, and a control means for maintaining constant the scanning time for each spectral slit width.

Fig. 10 is a diagrammatic view of a memory system of the invention applied to the spectrophotometer of Fig. 8 for standardization only, and includes various automatic control means, as well as other cooperating elements, the functions of which will hereinafter become apparent. Actual values appear on the components, being indicative only of one possible set of operable values, and are not intended to be limiting. A spectrophotometer 200 has extending therefrom the shafts 62 and 68 which are connected, as in Fig. 8, to the wavelength and slit drives, respectively. An electrical circuit 201, which will be described hereinafter, is also provided for connection to the detector or thermocouple 176.

Considering Fig. 10 in more detail, the voltages and signals provided for energization of various components are dependent upon the activity of other components, and it is convenient to begin at the source of potential applied to a dropping resistor 202, which is provided with a plurality of taps thereon to impress a voltage across a potentiometer 203 commensurate with the series resistance of the resistor 202. For convenience the taps are identified by the geometrically progressive numerals 1, 2, 4, 8 . . . 128, these numerals being representative of the time control in seconds per spectral slit width for scanning the useful wavelength region. A variable tap 204 of the potentiometer 203 provides a voltage with respect to ground that is impressed in part upon a wavelength servo-amplifier 205, the amplified voltage being directed to a wavelength motor 206 adapted to rotate the shaft 62 to rotate the mirror 173, in Fig. 8. In series relation with the voltage-producing portion of the potentiometer 203 is a direct-current generator 207 that is coupled to the drive shaft 62 of the motor and operable therewith to introduce a subtraction voltage in the voltage signal circuit which is proportional to the rate of rotation of the wavelength mirror. The generator effectively serves as damping means for the wavelength motor 206 to preclude undesirable oscillations thereof during traversal of the spectrum, and as a speed-metering means to establish the velocity of rotation of the wavelength motor approximately in direct proportion to the voltage at tap 204. The resultant or difference between the signal voltage and damping voltage is the effective signal applied to the servoamplifier 205. By this means an extreme range of speeds of wavelength drive shaft 62 may be accurately encompassed without resort to variations in gear ratio between the motor and the drive shaft.

As hereinbefore indicated, during the standardizing run it is necessary that the output or actuating signal emanating from the thermocouple 176 be maintained at a constant level. This is accomplished through the medium of a signal-balancing servomechanism. The ten-cycle, or other frequency, signal from the rapid response thermocouple 176 is amplified by an amplifier and synchronous rectifier 210 to produce an output signal having a direct-current component proportional to the thermocouple signal. The output is passed through a low-pass filter 211 to provide improved servomechanism performance and is compared in a differential amplifier 212 with an adjustable direct-current voltage provided by a potentiometer 213 to produce a differential signal. The differential signal is amplified by a slit servoamplifier 214 and directed to a slit motor 215 to position the slit-forming means 170, Fig. 8, to a slit width commensurate with the adjustable setting of the potentiometer 213. For different values of wavelength energy impressed upon the thermocouple, the slit motor will cause the slits to assume various corresponding widths in a manner to maintain the signal produced by the thermocouple at a constant level such that the output from filter 211 is substantially equal to the voltage provided by potentiometer 213.

For optimum sensitivity and chart recordation when analyzing a sample substance, it is desirable that the thermocouple output be predetermined upon standardization to provide a reference level for subsequent comparison with the playback or graph run. The potentiometer 213 serves this function, being adjustable prior to standardization to determine the signal applied through the amplifier and rectifier 210 to the differential amplifier 212. The voltage provided by the amplifier and rectifier is also directed to an adjustable period filter and amplifier 216 and thence to a displaceable recording element or means 217 of a chart recorder or recording means 218. The element 217 will accordingly maintain a fixed position throughout standardization and describe a straight line upon the progressively moving chart of the recorder 218. Adjustment of the potentiometer effects a variation of the reference level and in practical application adjustment is made to delineate a line upon the chart corresponding to a value that may be termed a 100% reference.

During the standardization run, the slit motor shaft 68 provides an adjustment of the tap 204 of the potentiometer 203 by means of an auxiliary drive 220 whereby the signal to the wavelength motor 206 is increased or decreased in accordance with the geometric slit width. The spectrophotometer is thus provided with a constant scanning time per spectral slit width, various constant scanning time being obtainable by connecting the potentiometer 203 to appropriate taps of the dropping resistor 202.

Thus, a control means connecting the output-signal generating means, e. g., the thermocouple 176, and the slit drive means, e. g., the shaft 68, is provided for so varying the slit widths as to maintain the output signal substantially constant during recording. Also, a control means connecting the wavelength drive means, e. g., the shaft 62, and the slit drive means is provided for moving an element of the dispersing means, e. g., the mirror 173, Fig. 8, at a rate proportional to geometric slit width to obtain a constant scanning time per spectral slit width.

Fig. 10 includes a chart drive control means, indicated by the numeral 222, to provide wavelength as a linear function of one of the chart coordinates. The dispersion of a prism such as the prism 172, Fig. 8, is such that the distribution of wavelength versus angle is a nonlinear function which resembles a portion of a tangent curve. The provision of the control means 222 for introducing a nonlinear element corresponding to the pre-established characteristic of this curve between the wavelength drive and the chart drive serves to convert the wavelength to a linear value. Referring to Fig. 10, the wavelength shaft 62 has geared thereto a shaft drive 223 to provide for variable positioning of a tap 224 of a potentiometer 225. The potentiometer 225 may be of the helical type and shunted by a plurality of fixed and adjustable resistor elements 226 so that the voltage distribution thereacross consists of a plurality of straight-line approximations of the true nonlinear wavelength curve. Another potentiometer 227 is in shunt with the potentiometer 225 and its resistor constituents and is provided with a variable tap 228 adapted to be moved by a chart motor 229. A source of power is applied to the potentiometers as shown, providing a differential voltage between the taps 224 and 228 that is applied to a chart servoamplifier 230, the amplified voltage being applied to a chart motor 229 and causing it to rotate in such a direction as to move the variable tap 228 to reduce the differential voltage to zero. A servomechanism is accordingly provided whereby the chart motor 229 will respond to continuous changes in the position of the tap 224, the rotation of the motor being a linear function of wavelength. The chart motor may be directly connected to the chart recorder 218, but for convenience of construction and visual observation the chart motor is adapted to drive a synchro transmitter 231 which is in electrical connection with a synchro receiver 232, whereby a chart-rolling means 233 is rotated to cause chart paper, or the like, to traverse the face of the recorder 218. The chart paper is thus moved in linear relation to changes in wavelength. During the standardizing run, therefore, the pen element 217 is caused to describe a substantially straight line upon the graph at the predetermined 100% reference level for a linear traversal of wavelength.

The recording apparatus of Fig. 10 is similar to that of Fig. 3 and like numerals have been employed to designate like components, the rotation of the shafts 62 and 68 providing phase-modulation as hereinbefore described. An additional filter 234 has been included in Fig. 10 to remove undesirable harmonics that may be generated in the master oscillator 50.

Figure 11:
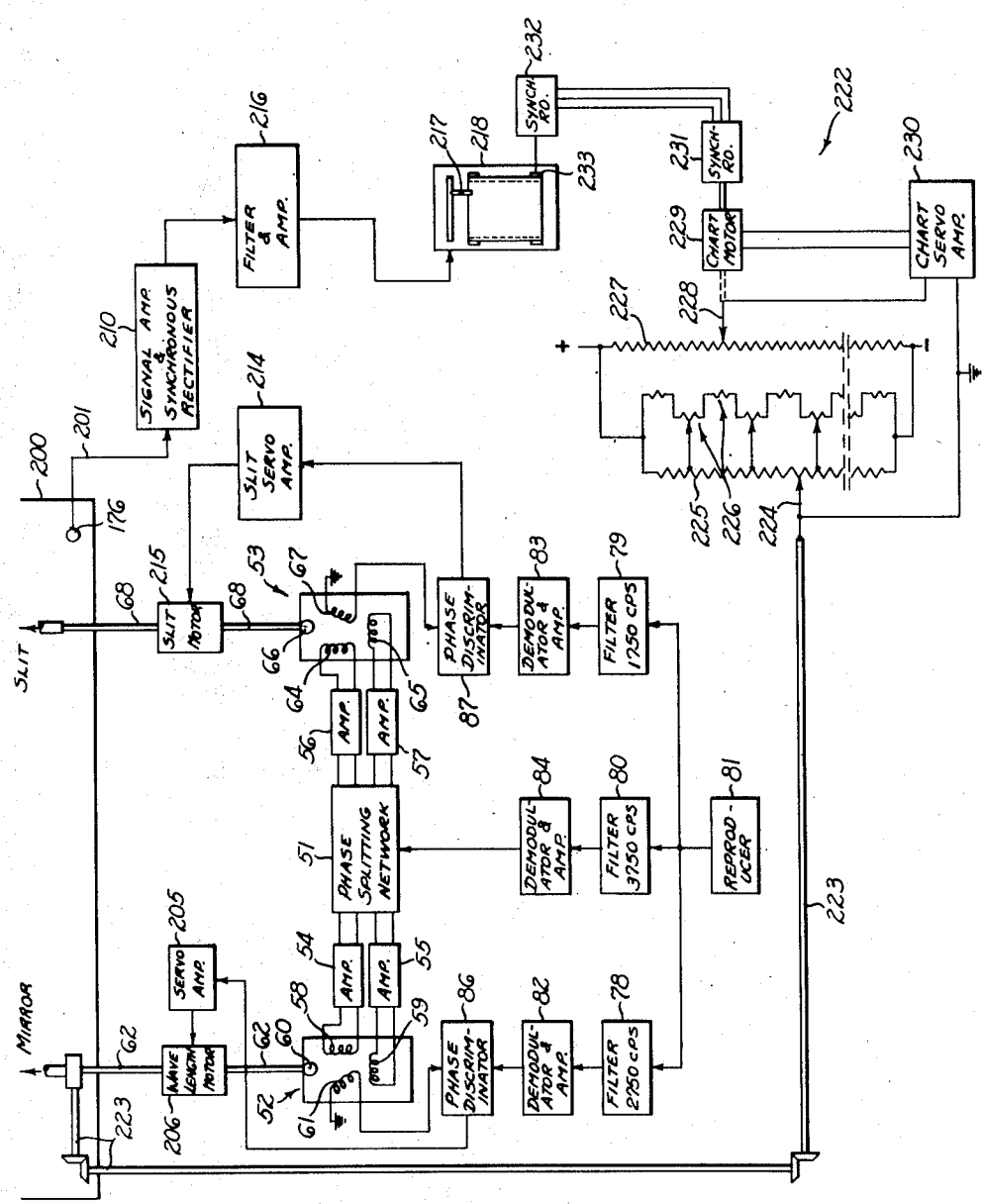
Fig. 11 is a diagrammatic view of a reproducing apparatus of the invention as applied to the spectrophotometer of Fig. 8, and includes a linear chart drive and a control means therefor, Fig. 11 being a counterpart of Fig. 10.

Fig. 11 is a correlative counterpart of the diagrammatic view of Fig. 10, being representative of the reproduction or playback run of the spectrophotometer to obtain a measurement for direct transmittancy recording of a sample in terms of linear wavelength. The sample to be examined is placed into the proper spectrophotometer cell region after removal of the known substance, if such was used upon standardization. The playback is initiated, as hereinbefore described, by returning the recorder 81, which now acts as a reproducer and is so identified in Fig. 11, to the initial position and reproducing the complex wave form memorized. The original information signals and secondary information signals are compared in the phase discriminators 86 and 87, the actuating signals emanating therefrom causing synchronized reiteration of the original operation of the wavelength motor 206 and the slit motor 215 during the recording run to duplicate the original motions of the shafts 62 and 68, respectively, exactly relative to one another and approximately in time sequence as hereinbefore described. Due to the coordination of slit width with wavelength in the standardization run, the output or actuating signal of the thermocouple 176 is now proportional to transmittancy of the sample. The signal is amplified, rectified, and filtered in the networks 210 and 216 and directed to the pen or other equivalent element 217 of the chart recorder 218. As in the standardizing run, the chart-rolling means 223 is operable to cause a traversal of the graph paper as a function of linear wavelength and simultaneously the pen element 217 will move laterally thereover in accordance with the transmittancy of the sample. There is thus provided a graph of transmittancy versus wavelength that may be used for immediate analysis to determine the constituents of the sample substance.

Figure 12:
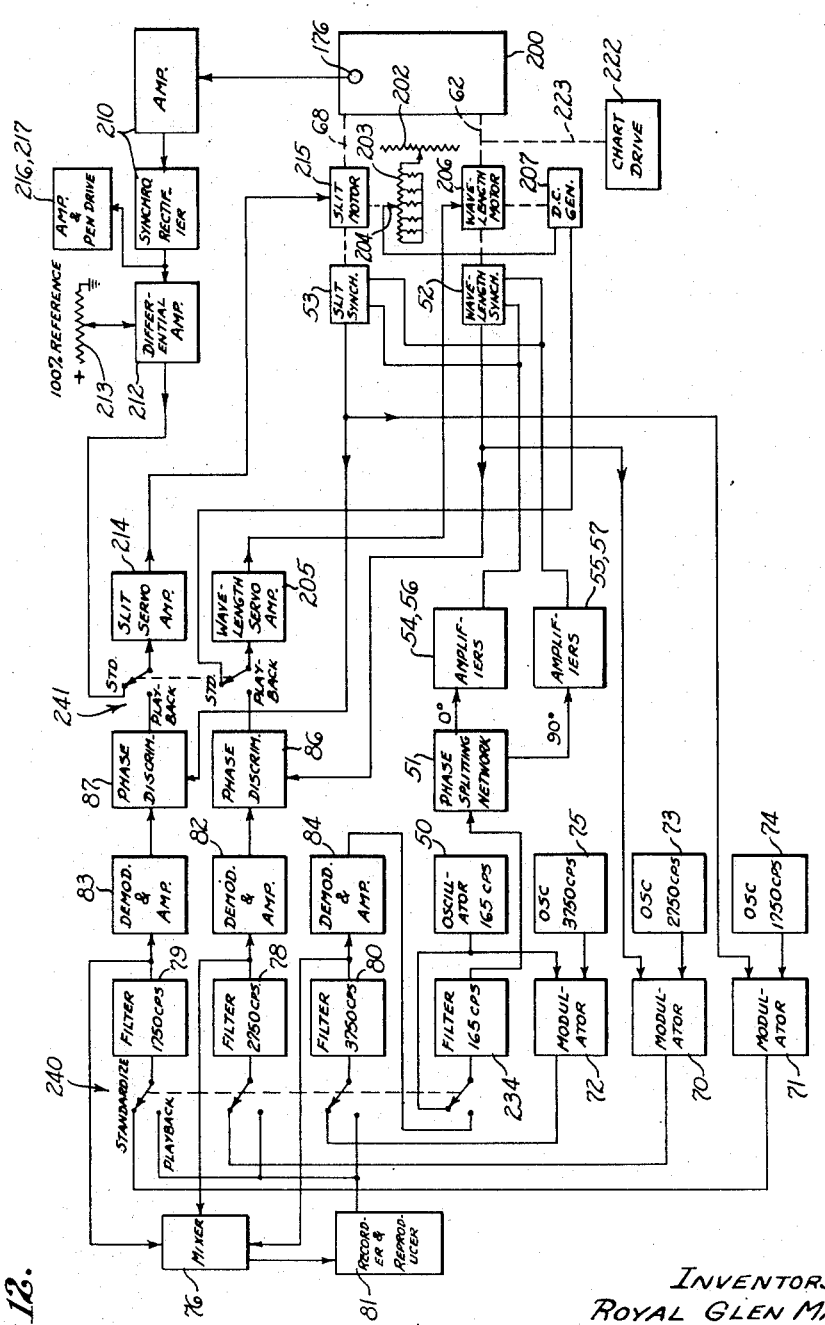
Fig. 12 is a diagrammatic view which is a simplified composite of Figs. 10 and 11.

Fig. 12 is a simplified composite diagrammatic view of the components comprising Figs. 10 and 11, including the switching means employed for shifting between standardization and playback. A switch 240 having a plurality of ganged elements is employed for appropriately directing signals for recordation or reproduction by the recorder and reproducer 81. A switch 241 having a plurality of gang elements is employed to apply appropriate actuating signals to the servoamplifiers 205 and 215 depending upon the nature of the run. The two switches 240 and 241 correspond to the switches 113 and 118 of Fig. 5 and perform the same functions as therein described. Recording and playback operation of the system shown in Fig. 12 are similar to the recording and playback operation of Figs. 10 and 11, respectively.

Another illustrative example embodying the principles of the invention is the sequential or alternative assignment of variables such as predetermined motions. These may be acts of work positioning, actuation of controls, grasping or clamping of members, etc., or any effort involving precise sequential functions. The performance of such functions may well be achieved by the apparatus hereinbefore described, however, a reduction in the number of carrier channels and associated circuits provides simplicity of structure. The system may be referred to as a master control whereby a master synchro serves to determine the recordation of a prototype run and subsequent reiteration in exact sequence.

Figure 13:
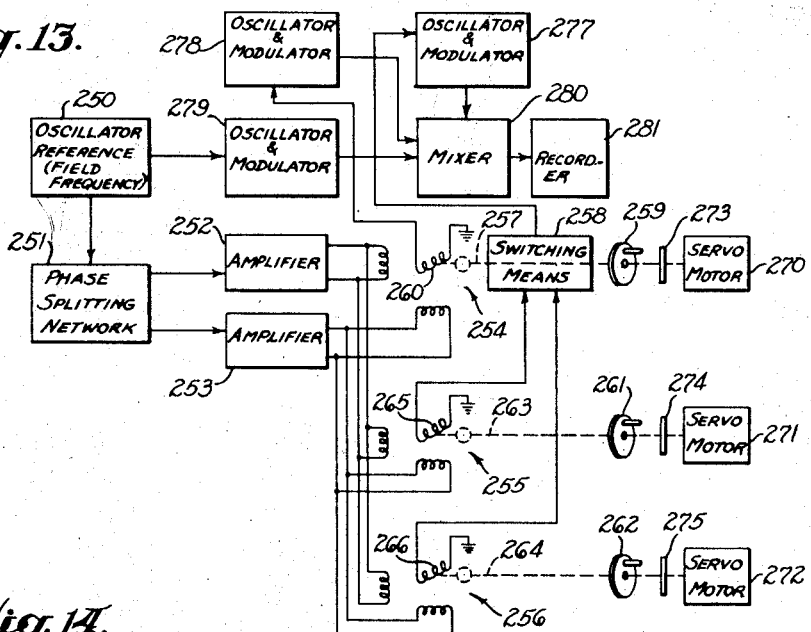
Fig. 13 is a diagrammatic view of a recording apparatus of the invention which is capable of recording either sequentially or alternatively two or more variables.
Figure 14:
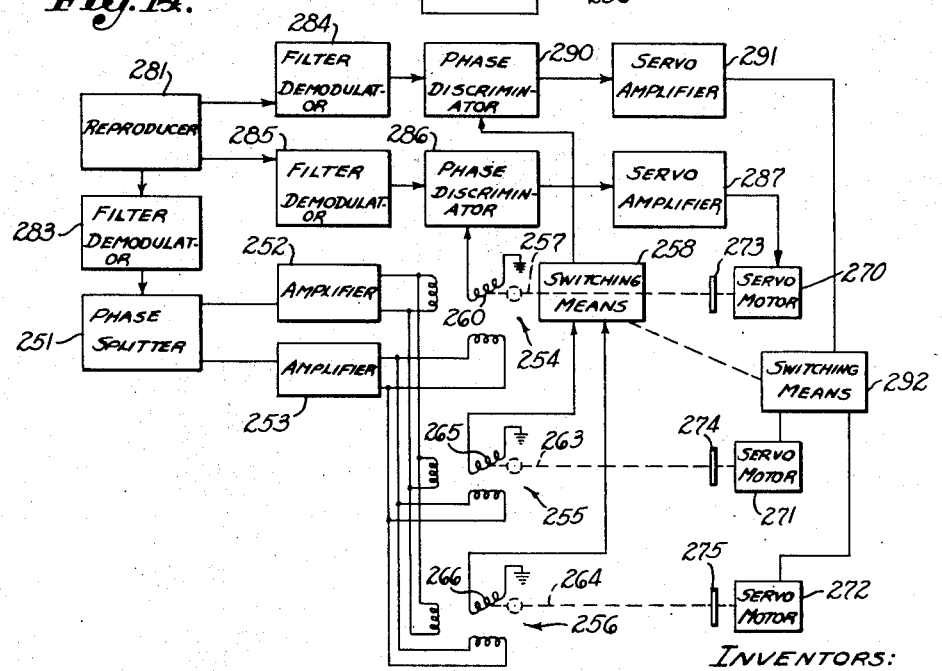
Fig. 14 is a diagrammatic view of an apparatus for reproducing either alternatively or sequentially two or more variables, Fig. 14 being a counterpart of Fig. 13.

Figs. 13 and 14 are diagrammatic illustrations of a sequential or master control system used for recordation and reproduction respectively.

Referring to Fig. 13, an oscillator 250 provides a cyclical reference signal to a phase-splitting network 251, the signal being segregated into two phase-displaced components, amplified by amplifiers 252 and 253 and applied to the field windings of a master synchro 254 and two additional synchros 255 and 256, respectively. The drawing is illustrative of only two such additional synchros but it is contemplated that any desired number may be utilized depending upon the number of the sequential or alternative variables. The use of a number of synchros greater than the number illustrated in the drawing requires no additional recording channels. Connected to the rotor shaft 257 of the synchro 254 is a switching means 258 that serves as a variable-assigning means. A hand control 259 is suitably connected to the shaft 257 whereby the shaft may be rotated to position the rotor winding 260 of the master synchro 254 and simultaneously actuate the switching means. The synchros 255 and 256 are provided with hand controls 261 and 262 respectively connected to the rotor shafts 263 and 264 of the respective synchros to provide positioning of the rotor windings 265 and 266. In the event that it is desirable to position the shafts 257, 263 and 264 by other means, for example, by power drives, motors 270, 271 and 272 may be geared thereto and releasably engaged therewith through clutch members 273, 274 and 275 as shown. The rotor windings 265 and 266 are connected to the switching means 258 whereby either rotor, or information, signal may be passed therethrough and/or interrupted as determined by the position of the shaft 257, the selected rotor signal being directed to a modulator 277 for modulation of a carrier. The information signal from the master synchro rotor winding 260 and the reference signal from the oscillator are directed to modulators 278 and 279 where the signals modulate their respective carriers. The three modulated carriers are linearly mixed in a mixer 280 and memorized by a recorder 281.

In operation for recording of the tasks or variables to be subsequently duplicated, motion is imparted to the shafts 263 and 264 of the synchros 255 and 256 respectively. The sequence of presentation may require the variable rotation of the shaft of the synchro 256 for a predetermined time period during which the shaft of the synchro 255 remains stationary, followed by a variable rotation of the shaft of the synchro 255 for an additional time period during which the shaft of the synchro 256 remains stationary. During the first mentioned time, the master synchro shaft 257 is positioned, manually or otherwise, to cause the information signal from the rotor 266 of the synchro 256 alone to be passed through the switching means 258. The intelligence recorded in this instance consists of the reference signal, the master synchro information signal and the information signal from the synchro 256. During the second mentioned time period the master synchro rotor shaft is displaced to connect the rotor winding 265 of the synchro 255 and alone record the information signal thereof. Therefore, there is provided a sequential or alternative assignment of information signals which is dependent upon the position of the master synchro.

Fig. 14 is the correlative playback or reproduction diagrammatic representation of Fig. 13. The recorder 281, being used as a reproducer, applies the composite wave form to filters and demodulators 283, 284 and 285, the reproduced cyclical reference signals being applied as before to the fields of the synchros. The information signal from the filter and demodulator 285 is compared in a phase discriminator 286 with the secondary information signal of the master synchro 254, the resultant voltage or actuating signal being amplified in a servoamplifier 287 and thence applied to the servomotor 270. The motor 270, being now engaged to the shaft 257 by the clutch 273, positions the switching means 258 to reproduce the original sequence of switch engagements. The information signal comprising the sequential information recorded is passed to a phase discriminator 290, the error voltage being amplified by a servoamplifier 291 and applied to an auxiliary switching means 292. The position of the switching means 258, as determined by the master synchro 254, assigns the appropriate rotor signal to the phase discriminator 290. Further, the switching means 258 is determinative of the circuit engagement of the auxiliary switching means 292 through a shaft 293 to apply the actuating signal to the appropriate servomotor of the additional synchros. Thus the sequential introduction of variables during the recording run is reproduced in precise form upon playback through the medium of a master control synchro.

The switching means as shown in Fig. 13 upon recordation may be automatic and controlled by the motion of either of the synchros 255 and 256. An interlock may be provided therewith to prevent simultaneous motion thereof. If preferred, the master synchro 254 may be conveniently replaced by a pure electrical circuit, and the circuit of Fig. 14 may be altered to accord with such arrangement. Suitable modification or elaborations, within the spirit of the invention, will be apparent to anyone skilled in the art.

Figure 15:
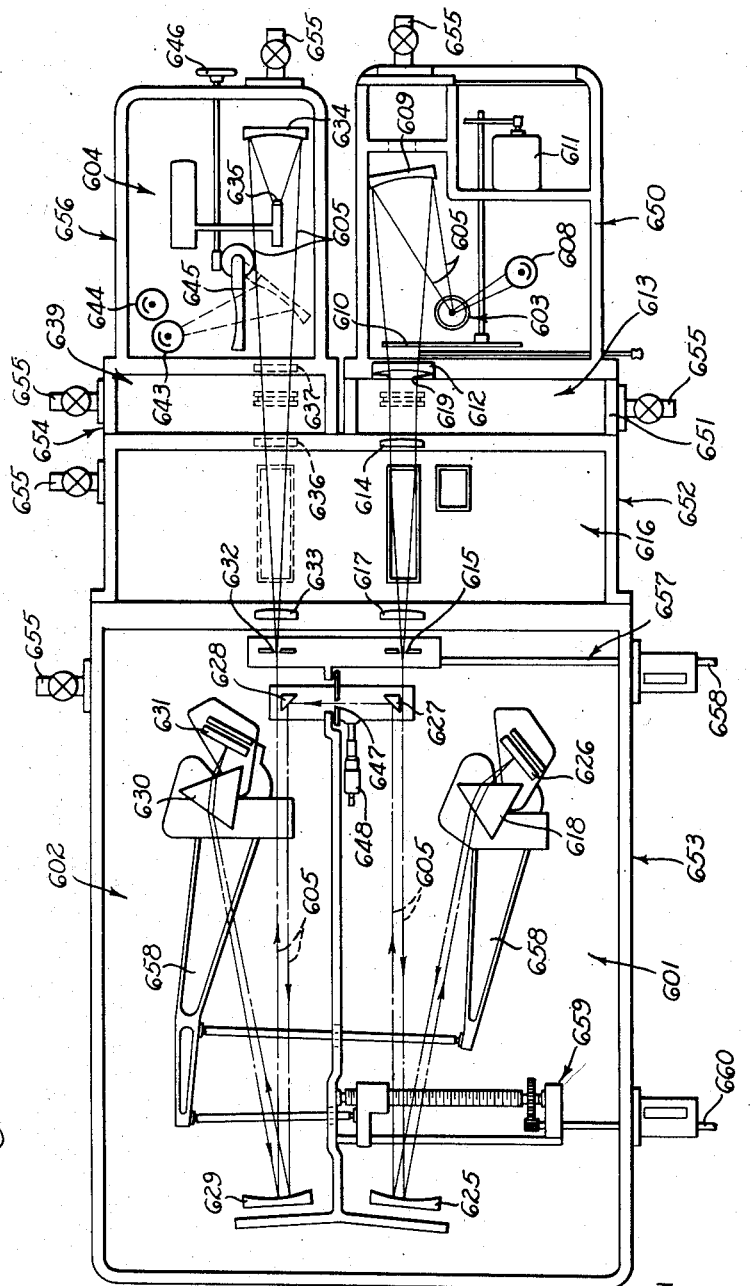
Fig. 15 is a diagrammatic view of an improved spectrophotometer of the invention.

Referring now to Fig. 15 of the drawings, illustrated therein is a spectrophotometer of the invention which finds particular utility in infrared spectrophotometry, although not limited thereto. In general, the spectrophotometer includes two monochromators or monochromator sections 601 and 602 optically connected in series, the first monochromator in the series being adapted to receive energy from a radiation source 603, and dispersed energy from the second monochromator in the series being admitted to an output-signal generating means 604. The optical path from the radiation source 603 through the first and second monochromators 601 and 602 to the output-signal generating means 604 is indicated by the arrowed lines 605.

Considering the spectrophotometer illustrated in Fig. 15 in more detail, the radiation source 603, which is exemplified as a Nernst glower, is monitored by a phototube 608 to maintain its emission constant. Radiation from the Nernst glower 603 is reflected by a condensing mirror 609 and passes through a beam chopper 610 which is driven at a constant frequency, e. g., 10 cycles per second, by a motor 611. The numeral 612 designates a negative collimating lens which collimates the beam in a liquid-cell region 613. This feature permits the use of liquid cells of diverse lengths, and allows the liquid-cell region to be lengthened to accommodate longer gas cells, or other special equipment, without refocusing. A lens 614 brings the beam to a focus on an entrance slit 615 through a gas-cell region 616 and a lens 617. The lens 617, together with the lens 614, produces an image on the front face of a prism 618 of the monochromator 601 which is conjugate with the plane of an external aperture 619, in order to permit the use of a narrow external beam and to avoid the introduction of radiation into the first monochromator at angles wider than can be usefully employed.

The radiation admitted by the entrance slit 615 is reflected toward the front face of the prism 618 by a collimating mirror 625 and then passes through the prism to be dispersed thereby, the dispersed radiation being reflected onto the rear face of the prism by a flat Littrow mirror 626. The radiation again passes through the prism and is further dispersed, being subsequently again reflected by the mirror 625. The outgoing radiation reflected by the mirror 625 is reflected by mirror 627 and passes through the intermediate aperture 647 onto a mirror 628 which corresponds to the mirror 627. From the mirror 628 the outgoing radiation or exit beam from the first monochromator 601, which is now the incoming radiation or entrance beam insofar as the second monochromator 602 is concerned, is deflected to collimating mirror 629, corresponding to mirror 625 of the first monochromator, passes through a prism 630, which corresponds to the prism 618, and is reflected back through the prism 630 by a flat Littrow mirror 631, which corresponds to the mirror 626. After passing through the prism 630 and being dispersed for the second time, the radiation is reflected by the mirror 629 onto an exit slit 632.

The outgoing radiation from the second monochromator 602, i. e., the exit beam passing through the exit slit 632, passes through a lens 633 which confines the beam so as to produce an image of the front face of the prism 630 in the plane of a thermocouple condensing mirror 634 which focuses on a thermocouple 635 through a thermocouple window. Windows 636 and 637 may be interposed between the lens 633 and the condensing mirror 634, to separate and isolate a liquid-cell region 639 from the gas-cell region 616 and the photodetector region 604.

The thermocouple window is preferably in the form of a hemispherical lens of a material such as potassium bromide which, together with the spherical condensing mirror 634, forms a condensing system which reduces the image of the exit slit tenfold, for example.

The numerals 643 and 644 designate photomultiplier tubes for use in the visible and ultraviolet ranges, while the numeral 645 designates an off-axis condensing mirror which can be swung into place by an external control 646 to deflect the beam onto the desired photomultiplier tube. This control also is coupled to a switching system, not shown, which makes the required electrical connections for using one of the photomultiplier tubes in place on the thermocouple.

Considering some of the features of the spectrophotometer illustrated in Fig. 15, the prisms 618 and 613, and the mirrors 626 and 631 respectively associated therewith, are so mounted as to make them readily interchangeable. Except for the orientations of the prisms 618 and 630 and the mirrors 626 and 631, the two monochromators 601 and 602 are mirror images of each other.

An intermediate aperture 647 is used between the mirrors 627 and 628 which is large enough to accommodate the entire image of the entrance slit 615 at the chosen wavelength, but small enough adequately to exclude stray radiation. In this way, stray radiation is minimized while the full resolving power predictable for four passages of radiation through the prism 618 and 630 is obtained.

The foregoing optics of the spectrophotometer provide very nearly theoretical resolution with spherical collimating mirrors, since the aberrations produced in one of the monochromators are approximately cancelled by the other one. A simple and effective means of adjusting to optimum focus on changing the prisms 618 and 630 is provided by placing the two mirrors 627 and 628 and the aperture 647 on a carriage which is provided with a calibrated adjustment means 648. The optical resolving power of the instrument is equal to that achievable with a single 150 mm. base prism, as compared to two 75 mm. base prisms 618 and 630, for example, but with substantially complete freedom from stray light errors.

As will be noted from Fig. 15, the spectrophotometer as illustrated includes six separate housing compartments, the Nernst glower being in lamp compartment 650, the entrance liquid-cell region 613 being in compartment 651, the gas-cell region 616 being in compartment 652, the two monochromators 601 and 602 being in compartment 653, the exit-liquid cell region 639 being in compartment 654, and the radiation-detector region 604 being in compartment 656. Regions 616, 639 and 604 are shown interconnected, but may be isolated if desired by windows 636 and 637.

The numeral 655 indicates connections for evacuating the instrument.

The widths of the entrance and exit slits 615 and 632 may be varied by a slit-drive means 657 which includes a shaft 658. The mirrors 626 and 631 are rotatably mounted by means of pivoted arms 658 to which is connected a wavelength drive means 659 including a shaft 660. The hereinbefore described information recording and reproducing system of the invention may be applied to the spectrophotometer illustrated in Fig. 15 of the drawings by connecting it to the shafts 658 and 660 in substantially the same manner as it is connected to the shafts 68 and 62, respectively, in Figs. 3 and 4 of the drawings. Thus, this spectrophotometer is another possible application of the recording and reproducing system of the invention.

In the foregoing, although other types of phase-modulating means were contemplated, as hereinbefore indicated, the drawings include representations of phase-splitting networks in combination with synchros to accomplish such purpose being indicative of the preferred construction for use where size and weight are not necessarily performance or operation limiting requisites. Recognizing such limitations the phase-modulating means may comprise essentially electronic components. The advantages may be apparent to those skilled in research fields of aircraft, controlled missiles and measuring and recording equipment carried therein.

Figure 16:
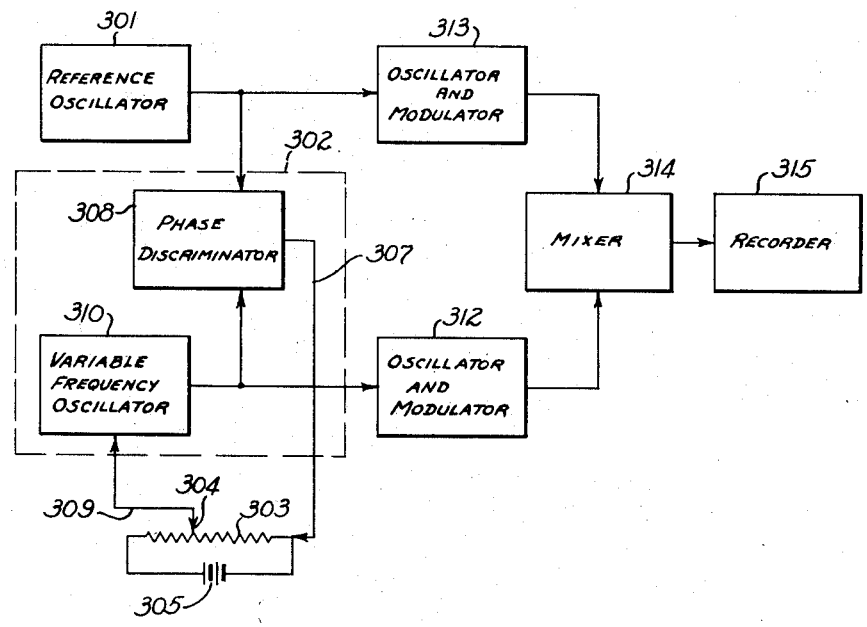
Fig. 16 is a diagrammatic view of a recording apparatus of the invention which embodies an alternative phase-modulating means.
Figure 17:
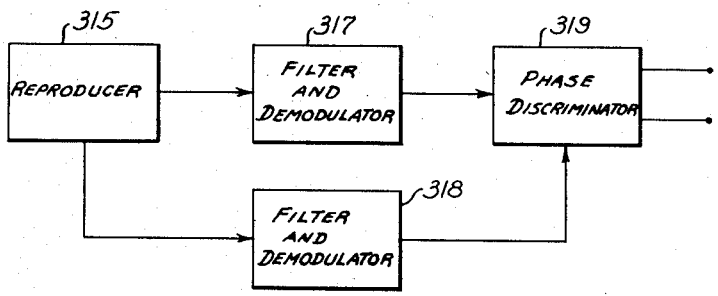
Fig. 17 is a diagrammatic view of a reproducing apparatus of the invention corresponding to the recording apparatus of Fig. 16.

Figs. 16 and 17 are diagrammatic views illustrative of recordation and reiteration respectively utilizing primarily electronic means. Referring to Fig. 16 a reference oscillator 301 provides a reference signal that is applied to a phase-modulating means 302 indicated as enclosed within the confines of the dotted lines. In this instance for illustration the variable under consideration for recordation is a voltage provided by a potentiometer 303 having a slidable tap 304 therein, the potentiometer being shunted by a bias or battery 305 that provides a source of potential. One extremity of the potentiometer is connected to a line 307 that connects to a phase discriminator 308 and the potentiometer tap 304 is connected to a line 309 that connects to a variable frequency oscillator 310. Thus, the voltage producing portion of the potentiometer 303 is in series connection with the aforementioned lines 307 and 309. The variable frequency oscillator 310 is connected to the phase discriminator 308 and also to an oscillator and modulator 312. The reference oscillator 301 is also connected to an oscillator and modulator 313. The signals emanating from the modulators 312 and 313 are linearly mixed in a mixer 314 and directed to a recorder 315 for memorization.

In operation, the tap 304 is varied in accordance with the variable desired and the voltage thus derived, plus a balancing voltage that will subsequently be referred to, is applied to the variable frequency oscillator 310 wherein the frequency generated therein is increased or decreased as a function of the applied voltage. This controlled generated frequency corresponds to the variable information signal hereinbefore described. The phase discriminator 308 receives the reference signal from the oscillator 301 and the information signal derived from the variable oscillator 310 and compares the two signals, any phase difference therebetween resulting in an error or balancing voltage applied to the line 307. This is the voltage that was hereinbefore referred to as a balancing voltage and its effect is to raise or lower the potential level of the potentiometer 303 with respect to any reference base, i. e., ground. Effectively, therefore, the variable frequency oscillator 310 has applied thereto a differential or additive voltage comprising the signal from the phase discriminator 308 and the variable bias or signal from the voltage producing portion of the potentiometer 303. For any instantaneous position of the potentiometer, therefore, there is provided an information signal having a particular phase relationship with the reference signal which is applied to the oscillator and modulator 312 simultaneously with application of the reference signal to the oscillator and modulator 313. As hereinbefore indicated, the two signals are memorized in their proper relation to each other upon the recorder 315.

Fig. 17 is the correlative playback or reiteration diagrammatic view corresponding to Fig. 16. The recorder 315 is herein used as the reproducer and applies the complex wave form to a filter and demodulator 317 and a filter and demodulator 318 comprising the channels for the reference signal and information signal respectively. The demodulated signals are communicated to a phase discriminator 319 wherein the signals are compared in phase to produce an output voltage as a function of the phase error. The output so produced will vary in amplitude substantially proportional to the variable originally impressed. An amplifier may be used, if necessary, to increase the gain of the output signal to exactly correspond to or duplicate the variable voltage originally impressed.

Thus there is provided a phase-modulating means comprising substantially electronic components and having the advantages hereinbefore discussed.

While we have disclosed various exemplary embodiments and applications of the present invention, it will be understood that the invention is susceptible of various other embodiments and applications without departing from the spirit thereof.

We claim as our invention:

1. In a recording apparatus, the combination of: a cascade of multiphase synchros each having at least two field windings and a rotor winding; generating means connected to said field windings of each of said synchros for applying thereto a reference signal; phase-splitting means interposed between said generating means and said field windings of each of said synchros for splitting said reference signal applied to said field windings into cyclical electrical signals of different phases applied to the respective field windings, whereby to induce in said rotor winding of each of said synchros a cyclical informational signal the phase of which varies with respect to the reference signal applied to the field windings thereof as a particular function of the position of said rotor winding relative to said field windings; driving means connected to the rotors of all of said synchros in said cascade and adapted to rotate the rotor of the finest synchro in said cascade through a maximum range, said driving means so connecting the rotors of said synchros that the maximum phase excursion of the information signal induced in the rotor winding of the coarest synchro in said cascade relative to the reference signal applied to the field windings thereof is less than one-half electrical cycle for rotation of the rotor of the finset synchro in said cascade through said maximum range; recording means; and means for connecting said rotor windings and said generating means to said recording means, whereby said recording means simultaneously records said information signals and said reference signal.

2. In a recording and reproducing apparatus, the combination of: means for generating a cyclical reference signal; a cascade of multiphase synchros each having at least two field windings and a rotor winding; phase-splitting means connected to said generating means and to said field windings of each of said synchros for producing in said field windings of each of said synchros cyclical electrical signals of different phases and of the same frequency as said reference signal, whereby to induce in said rotor winding of each of said synchros a cyclical information signal the phase of which varies with respect to said reference signal as a particular function of the position of said rotor winding of said synchro relative to said field windings thereof; driving means connected to the rotors of all of said synchros in said cascade for driving the rotor of the finest synchro in said cascade through a maximum range and for driving the rotor of the coarsest synchro in said cascade through a corresponding range such that the maximum phase excursion of the information signal induced in the rotor winding of said coarsest synchro relative to said reference signal is less than one-half electrical cycle; recording means for simultaneously recording a plurality of signals; means for connecting said generating means and said rotor windings to said recording means, whereby said recording means simultaneously records said reference signal and said information signals; means for reproducing said reference signal and said information signals; actuating means for producing variations in a quantity representative of the positions of the rotor windings of said synchros relative to said field windings thereof; and means, including switching means and phase-demodulating means sequentially responsive to phase variations between said reproduced reference signal and said reproduced information signals, for operating said actuating means to vary said quantity as the same respective particular function of phase variations between said reproduced reference signal and said reproduced information signals.

3. A recording and reproducing apparatus as defined in claim 2 wherein said phase-demodulating means includes: a second cascade of synchros similar to the one defined in claim 2; phase-splitting means connected to said reproducing means and to said field windings of each of said synchros in said second cascade for splitting said reproduced reference signal into different phases applied to said field windings of said synchros in said second cascade; and phase-discriminating means having its input side connected to said reproducing means and to the rotor windings of said synchros in said second cascade for discriminating between said reproduced information signals and information signals induced in said rotor windings of said synchros of said second cascade, the output side of said discriminating means being connected to said actuating means.

4. A recording and reproducing apparatus as defined in claim 3 wherein said switching means is interposed between the output side of said phase-discriminating means and said actuating means, and connected thereto, and is adapted to apply to said actuating means successive actuating signals respectively variable with phase differences between the information signals originating in successive pairs of corresponding synchros in said cascades.

5. An apparatus as defined in claim 4 wherein said one cascade and said second cascade are one and the same, and wherein said phase-splitting means are one and the same.

6. In an apparatus for recording at least two variables, the combination of: means for generating a cyclical reference signal; means for generating at least two cyclical information signals the phases of which vary with respect to said reference signal as particular functions of variations in said variables, respectively; means, including switching means, for sequentially selecting said information signals; means for generating a switching control signal, the phase of which varies with respect to said reference signal as a particular function of the position of said switching means; and means for recording said selected information signals, said switching control signal and said reference signal.

7. An apparatus as in claim 6 including in addition: means for reproducing said selected information signals, said switching control signal and said reference signal; at least two translating means for respectively translating variations in the phases of said selected information signals relative to said reference signal into variations in quantities respectively representative of said variables; and switching means controlled by said switching control signal for sequentially actuating said translating means.

8. In an apparatus for recording a variable, the combination of: a reference-signal generator for generating a cyclical reference signal; an information-signal generator for generating at least two cyclical information signals; two phase modulators responsive to variations in said variable for varying the phases of said information signals, respectively, relative to said reference signal as functions of variations in said variable, one of said phase modulators producing a maximum phase excursion of the corresponding information signal from said reference signal of more than one-half electrical cycle for the maximum range of variations in said variable; means interconnecting said phase modulators for limiting the maximum phase excursion produced by the other of said phase modulators to less than one-half electrical cycle for said maximum range of variations in said variable; a recorder; and means connecting said reference-signal generator and said phase modulators to said recorder so as to record said reference signal and said variable-phase information signals.

9. In a recording and reproducing apparatus, the combination of: a recording apparatus as defined in claim 8; a reproducer for reproducing said reference signal and said variable-phase information signals; actuating means for producing variations in a quantity representative of variations in the phases of said reproduced information signals from said reproduced reference signal; and means, including phase-demodulating means sequentially responsive to phase variations between said reproduced reference signal and said reproduced information signals, for operating said actuating means to vary said quantity as the same respective functions of phase variations between said reproduced reference signal and said reproduced information signals.

10. In an apparatus for recording and reproducing a variable, the combination of: a reference-signal generator for generating a cyclical reference signal; a primary information-signal generator for generating at least two cyclical, primary information signals; a primary cascade of at least two primary phase modulators responsive to variations in said variable for varying the phases of said primary information signals, respectively, relative to said reference signal as particular functions of variations in said variable, one of said primary phase modulators producing a maximum phase excursion of the corresponding primary information signal from said reference signal of more than one-half electrical cycle for the maximum range of variations in said variable; means interconnecting said primary phase modulators for limiting the other of said primary phase modulators to a maximum phase excursion of less than one-half electrical cycle for said maximum range of variations in said variable; a recorder; means connecting said reference-signal generator and said primary phase modulators to said recorder so as to record said reference signal and said variable-phase, primary information signals; a reproducer for reproducing said reference signal and said variable-phase, primary information signals; actuating means for producing variations in a quantity representative of said variable; and phase-demodulating means responsive to phase variations between said reproduced reference signal and said reproduced, variable-phase, primary information signals for operating said actuating means to vary said quantity as the same particular functions of phase variations between said reproduced reference signal and said reproduced, variable-phase, primary information signals, said phase-demodulating means including a secondary information-signal generator for generating at least two cyclical, secondary information signals, and including a secondary cascade of interconnected, secondary phase modulators, said secondary phase modulators being connected to said reproducer and to said secondary information-signal generator so as to vary the phases of said secondary information signals with respect to said reproduced reference signal, said phase-demodulating means further including phase-discriminating means connected to said recorder and to said secondary phase modulators and responsive to said reproduced, variable-phase, primary information signals and said variable-phase secondary information signals, for producing and applying to said actuating means an actuating signal variable with phase differences between said reproduced, variable-phase, primary information signals and said variable-phase, secondary information signals, respectively; and means interconnecting said secondary phase modulators in a phase relation identical with that of said primary cascade of interconnected, primary phase modulators for limiting the maximum phase excursion of one of said secondary phase modulators to less than one-half electrical cycle for the maximum range of variations in said quantity while the phase excursion produced by the other of said secondary phase modulators exceeds one-half electrical cycle for said maximum range of variations in said quantity.

11. An apparatus as defined in claim 10 wherein said cascades of phase modulators are one and the same and wherein said primary and secondary information-signal generators are also one and the same.

12. In a recording apparatus, the combination of: a cascade of multiphase synchros each having at least two field windings and a rotor winding; signal generating means connected to said field windings of each of said synchros for producing a cyclical reference signal and for applying to said field windings of each of said synchros cyclical electrical signals in fixed phase-difference relation and of the same frequency as said reference signal, whereby to induce in said rotor winding of each of said synchros a cyclical information signal the phase of which varies with respect to said reference signal as a particular function of the position of said rotor winding relative to said field windings; driving means interconnecting the rotors of all of said synchros in said cascade for limiting the maximum phase excursion of the information signal induced in the rotor winding of the coarsest synchro in said cascade relative to said reference signal to less than one-half electrical cycle for the maximum phase excursion of the finest synchro in said cascade, said driving means including means for rotating the rotors of said synchros at progressively higher speeds from the coarsest synchro to the finest; a recorder; and means connecting said generating means and said rotor windings to said recorder so as to record said information signals and said reference signal.

13. In a recording and reproducing apparatus, the combination of: a recording apparatus as defined in claim 12; a reproducer for reproducing said reference signal and said information signals; actuating means for producing variations in a quantity representative of the positions of the rotor windings of said synchros relative to said field windings thereof; and means, including switching means and phase-demodulating means sequentially responsive to phase variations between said reproduced reference signal and said reproduced information signals, for operating said actuating means to vary said quantity as the same respective particular functions of phase variations between said reproduced reference signal and said reproduced information signals.

14. A recording and reproducing apparatus as defined in claim 13 wherein said phase-demodulating means includes: a second cascade of synchros similar to the one defined in claim 12; signal generating means connected to said field windings of each of said synchros in said second cascade for applying to said field windings of each of said synchros in said second cascade cyclical electrical signals in fixed phase-difference relation and of the same frequency as said reproduced reference signal; and phase-discriminating means having its input side connected to said reproducer and to the rotor windings of said synchros in said second cascade for discriminating between said reproduced information signals and information signals induced in said rotor windings of said synchros of said second cascade, the output side of said discriminating means being connected to said switching means and said actuating means, whereby said switching means selectively controls the output of said discriminating means.

15. An apparatus as defined in claim 14 wherein said switching means includes means for applying to said actuating means different actuating signals respectively variable with phase differences between the information signals originating in different pairs of corresponding synchros in said cascades.

16. An apparatus as defined in claim 15 wherein said cascades of synchros are one and the same.

17. In an apparatus for recording at least two variables, the combination of: a signal generator for generating a cyclical reference signal; a main synchro and at least two auxiliary synchros each having at least two field windings and a rotor winding; phase-splitting means connected to said signal generator and to said field windings of each of said synchros for producing in said field windings of each of said synchros cyclical electrical signals in fixed phase-difference relation, whereby to induce in the rotor winding of said main synchro a control signal the phase of which varies with respect to said reference signal as a particular function of the position of the rotor winding of said main synchro relative to the field windings thereof, and whereby to induce in the rotor windings of said auxiliary synchros cyclical information signals the phases of which vary with respect to said reference signal as particular functions of the rotor windings of said auxiliary synchros relative to the field windings thereof, the positions of the rotor windings of said auxiliary synchros varying with variations in said variables, respectively; a recorder; means electrically connecting said signal generator and the rotor winding of said main synchro to said recorder so as to record said reference and control signals; and selective switching means operatively connected to the rotor winding of said main synchro and electrically connected to the rotor windings of said auxiliary synchros and to said recorder so as to selectively record said information signals under the control of said main synchro.

18. In an apparatus for recording at least two variables, the combination of: a signal generator for generating a cyclical reference signal; a variable-phase control-signal generator and a positionable control member operatively connected thereto, whereby to generate a control signal the phase of which varies with respect to said reference signal as a particular function of the position of said control member; at least two snychros each having at least two field windings and a rotor winding; phase-splitting means connected to said signal generator and to said field windings of each of said synchros for producing in said field windings of each of said synchros cyclical electrical signals in fixed phase-difference relation whereby to induce in the rotor windings of said synchros cyclical information signals the phases of which vary with respect to said reference signal as particular functions of the rotor windings of said synchros relative to the field windings thereof, the positions of the rotor windings of said synchros varying with variations in said variables, respectively; a recorder; means electrically connecting said reference signal generator and said control-signal generator to said recorder so as to record said reference and control signals; and selective switching means operatively connected to said control member and electrically connected to the rotor windings of said synchros and to said recorder so as to selectively record said information signals under the control of said control member.

19. An apparatus as defined in claim 18 including in addition: a reproducer for reproducing said selected information signals, said control signal and said reference signal; a master synchro and at least two controlled synchros each having a rotor winding and at least two field windings; a phase-splitting means connected to said reproducer and to the field windings of each of said master and controlled synchros and responsive to said reproduced reference signal for producing in the field windings of each of said master and controlled synchros cyclical electrical signals in fixed phase-difference relation; master and controlled servomotors respectively connected to the rotors of said master and controlled synchros; a first selective switching device operatively connected to said master servomotor to be actuated thereby; a phase discriminator connected to said reproducer and the rotor winding of said master synchro and connected to said master servomotor, said phase discriminator being responsive to said reproduced control signal so that said master servomotor responds to any phase differences between said reproduced control signal and a control signal induced in the rotor winding of said master synchro to operate said switching device; means connecting the rotor windings of said controlled synchros to said first switching device; another phase discriminator connected to said first switching device and to said reproducer and responsive to said reproduced, selected information signals; another selective switching device operatively connected to said master servomotor so as to be actuated thereby, said other switching device being connected to said other phase discriminator; and means connecting said other switching device to said controlled servomotors, whereby said controlled servomotors respond to any phase differences between said reproduced, selected information signals and cyclical signals induced in the rotor windings of said controlled synchros.

20. An apparatus as defined in claim 19 wherein said main and master synchros are one and the same, said auxiliary and controlled synchros are respectively one and the same, said phase-splitting means are one and the same, and said switching means and said first switching device are one and the same.

21. In a reproducing apparatus, the combination of: a record having thereon a reference signal, at least two selected information signals, and a control signal for said selected information signals; a reproducer for reproducing said selected information signals, said control signal and said reference signals; a master synchro and at least two controlled synchros each having a rotor winding and at least two field windings; phase-splitting means connected to said reproducer and to the field windings of each of said master and controlled synchros and responsive to said reproduced reference signal for producing in the field windings of each of said master and controlled synchros cyclical electrical signals in fixed phase-difference relation; master and controlled servomotors respectively connected to the rotors of said master and controlled synchros; a first selective switching device operatively connected to said master servomotor to be actuated thereby; a phase discriminator connected to said reproducer and the rotor winding of said master synchro and connected to said master servomotor, said phase discriminator being responsive to said reproduced control signal so that said master servomotor responds to any phase differences between said reproduced control signal and a control signal induced in the rotor winding of said master synchro to operate said switching device; means connecting the rotor windings of said controlled synchros to said first switching device; another phase discriminator connected to said first switching device and to said reproducer and responsive to said reproduced, selected information signals; another selective switching device operatively connected to said master servomotor so as to be actuated thereby, said other switching device being connected to said other phase discriminator; and means connecting said other switching device to said controlled servomotors, whereby said controlled servomotors respond to any phase differences between said reproduced, selected information signals and cyclical signals induced in the rotor windings of said controlled synchros.

References Cited in the file of this patent
UNITED STATES PATENTS

| Number | Name | Date |
|---|---|---|
| 1,943,898 | Muller | Jan. 16, 1934 |
| 1,964,365 | Razek et al. | June 26, 1934 |
| 2,423,440 | Neergaard | July 8, 1947 |
| 2,428,180 | Scherbatskoy | Sept. 30, 1947 |
| 2,436,235 | Sunstein | Feb. 17, 1948 |
| 2,462,213 | Nagel et al. | Feb. 22, 1949 |
| 2,475,245 | Leaver et al. | July 5, 1949 |
| 2,502,215 | Giffen et al. | Mar. 28, 1950 |
| 2,537,770 | Livingston et al. | Jan. 9, 1951 |